US012764437B2

(12) United States Patent
Goto et al.

(10) Patent No.: US 12,764,437 B2
(45) Date of Patent: Oct. 13, 2026

(54) IMAGE SENSOR WITH SHARED LOW CONVERSION GAIN CAPACITOR

(71) Applicant: OMNIVISION TECHNOLOGIES, INC., Santa Clara, CA (US)

(72) Inventors: Takayuki Goto, Foster City, CA (US); Sang Joo Lee, Sunnyvale, CA (US); Keiji Mabuchi, Cupertino, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 93 days.

(21) Appl. No.: 18/955,563

(22) Filed: Nov. 21, 2024

(65) Prior Publication Data

US 2026/0143258 A1 May 21, 2026

(51) Int. Cl.
*H04N 25/77* (2023.01)

(52) U.S. Cl.
CPC .................................. *H04N 25/77* (2023.01)

(58) Field of Classification Search
CPC ..................................................... H04N 25/77
See application file for complete search history.

(56) References Cited

U.S. PATENT DOCUMENTS 8,014,124 B2 9/2011 Lin
9,900,481 B2 2/2018 Geurts et al.
11,818,478 B2 11/2023 Innocent et al.
2013/0256509 A1 10/2013 Yang et al.
2017/0347047 A1* 11/2017 Mao ....................... H04N 25/59
2020/0066773 A1* 2/2020 Tashiro .................. H04N 25/59
2021/0242257 A1* 8/2021 Lee ....................... H10F 39/802
2022/0053152 A1 2/2022 Ikuma et al.
2023/0232133 A1 7/2023 Miyauchi
(Continued)

FOREIGN PATENT DOCUMENTS

WO 2024254854 A1 12/2024

OTHER PUBLICATIONS

Yun et al., A 0.6μm Small Pixel for High Resolution CMOS Image Sensor with Full Well Capacity of 10,000e- by Dual Vertical Transfer Gate Technology, 2022 IEEE Symposium on VLSI Technology and Circuits (VLSI Technology and Circuits), Jun. 2022, pp. 351-352, DOI: 10.1109/VLSITechnologyandCir46769.2022.9830254.

(Continued)

*Primary Examiner* — Gevell V Selby
(74) *Attorney, Agent, or Firm* — Christensen O'Connor Johnson Kindness PLLC

(57) ABSTRACT

An image sensor comprising a pixel cell array is described. The pixel cell array includes a plurality of pixel cells arranged in rows and columns. Individual pixel cells included in the plurality of pixel cells each includes one or more photodiodes configured to photogenerate image charge in response to incident light, a first floating diffusion, a second floating diffusion, a third floating diffusion, a dual floating diffusion transistor coupled between the first floating diffusion and the second floating diffusion, a lateral overflow transistor coupled between the first floating diffusion and the third floating diffusion, and a shared low conversion gain capacitor. The dual floating diffusion transistor and the lateral overflow transistor are coupled in parallel to the first floating diffusion. The second floating diffusion is coupled between the shared low conversion gain capacitor and the first floating diffusion.

20 Claims, 11 Drawing Sheets

(56) References Cited

U.S. PATENT DOCUMENTS

| | | | | |
|---|---|---|---|---|
| 2023/0362505 | A1 | 11/2023 | Yun et al. | |
| 2024/0015414 | A1* | 1/2024 | Mabuchi ................ | H04N 25/77 |
| 2024/0113139 | A1 | 4/2024 | Zhang et al. | |

OTHER PUBLICATIONS

Rui Wang et al., “Triple Conversion Gain Pixel,” U.S. Appl. No. 18/353,680, filed Jul. 17, 2023, 46 pages.

* cited by examiner

IMAGE SENSOR WITH SHARED LOW CONVERSION GAIN CAPACITOR

TECHNICAL FIELD

This disclosure relates generally to image sensors, and in particular but not exclusively, relates to CMOS image sensors and applications thereof.

BACKGROUND INFORMATION

Image sensors are one type of semiconductor device that have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, size, etc.) through both device architecture design as well as image acquisition processing. However, it is appreciated that many of these metrics are inversely related. For example, pixel size may be increased to improve dynamic range but have increased noise. In another example, resolution may be increased by increasing the number of pixels, but if pixel size is maintained then the physical size of the image sensor increases. Accordingly, improving one or more performance metrics of semiconductor devices such as image sensors while mitigating adverse effects on other performance metrics remains challenging.

The typical image sensor operates in response to image light reflected from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is readout as analog image signals from the column bitlines and converted to digital values to produce digital images (i.e., image data) representative of the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
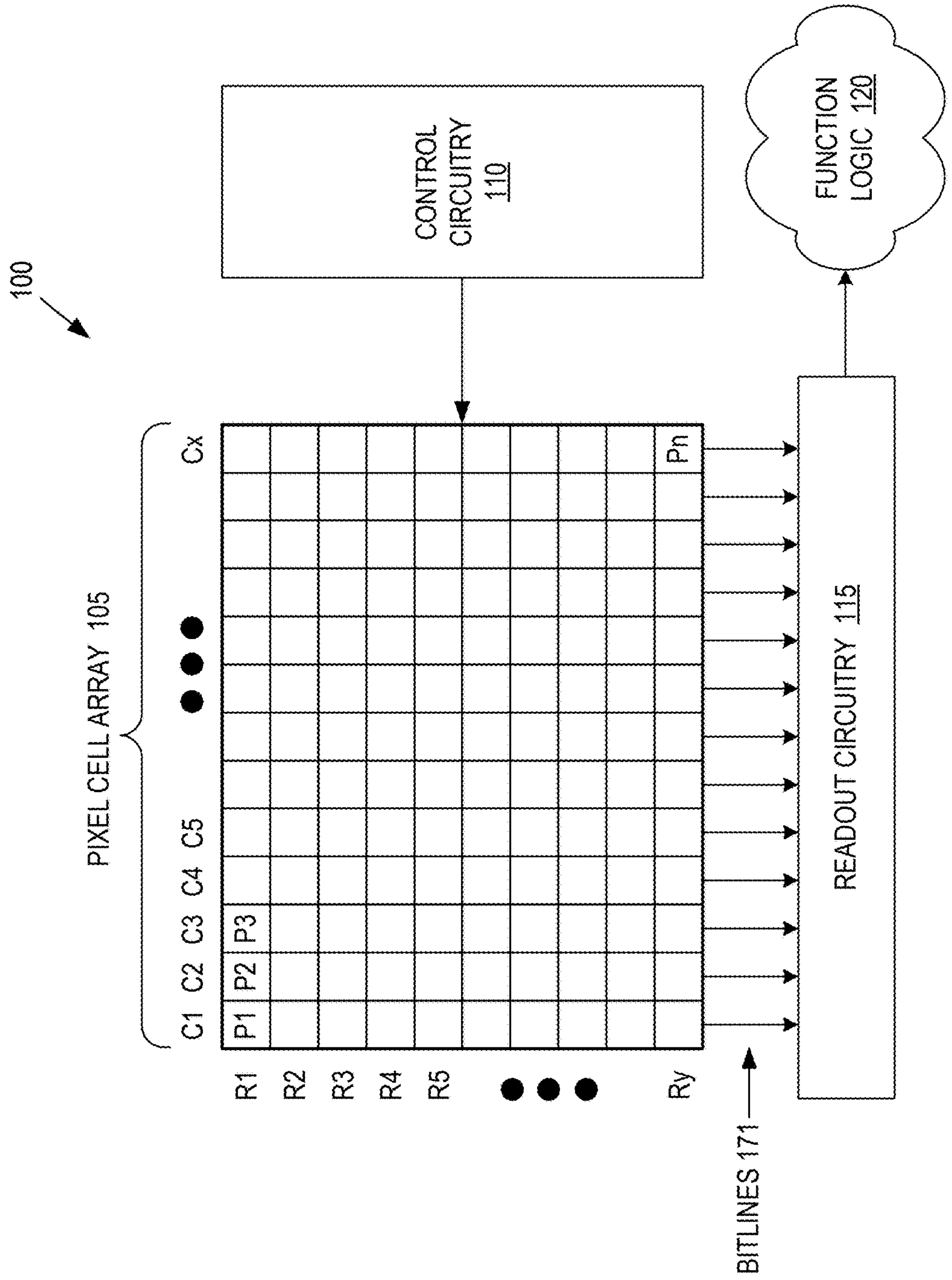
FIG. 1A illustrates a block diagram of an imaging system, in accordance with an embodiment of the disclosure.

Embodiments of an apparatus, system, and method each related to a pixel cell of an imaging system or image sensor with shared low conversion gain capacitor are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It will be understood that, although the terms first, second, third, etc., may be used in the disclosure and claims to describe various elements, these elements should not be limited by these terms and should not be used to determine the process sequence or formation order of associated elements. Unless indicated otherwise, these terms are merely used to distinguish one element from another element. Thus, a first element discussed below could be termed a second element without departing from the teachings of the disclosed embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Embodiments of the disclosure describe image sensors or imaging systems with pixel cells having shared low conversion gain capacitors. In conventional imaging systems, multiple modes of readout are used to improve signal-to-noise (SNR) and widen dynamic range (DR). Examples of readout modes include high conversion gain mode used in low light conditions and low conversion gain mode used in bright light conditions that respectively make use of the differing full well capacity associated with the readout modes. In embodiments of the disclosure, a third conversion gain mode, a lateral overflow integration capacitor (LOFIC) conversion gain mode may be utilized to expand the dynamic range of the image sensor. However, it may be challenging for full pixel cell readout (e.g., pixel cells having four or more photodiodes) as the capacitor associated with the pixel cell may not have sufficiently high capacitance to store image charge generated by all photodiodes included in a given pixel cell for low conversion gain readout when all the photodiodes are saturated. Additionally, achieving target conversion gain ratios between high conversion gain mode, low conversion gain mode, and LOFIC conversion gain mode may be difficult to achieve.

FIG. 1A illustrates a block diagram of an imaging system 100, in accordance with an embodiment of the disclosure. In particular, imaging system 100 includes a pixel cell array 105, control circuitry 110, readout circuitry 115, function logic 120, and a plurality of bitlines 171. In one embodiment, pixel cell array 105 is a two-dimension arrayal including a plurality of pixel cells (e.g., P1, P2, P3, . . . Pn) that are arranged in rows (e.g., R1 to Ry) and columns (e.g., C1 to Cx) to acquire image data of a person, place, object, etc., which can be used to render an image of a person, place, object, etc. In some embodiments, each of the plurality of pixel cells may include one, two, four or more photodiodes. In the same or different embodiments, each of the plurality of pixel cells may include one or more capacitors coupled to one or more photodiodes. In some embodiments, readout circuitry 115 may be configured to read out image data (e.g., representative of image charge photogenerated by photodiodes included in the plurality of pixel cells in the pixel cell array 105 in response to incident light) through plurality of bitlines 171 (e.g., column bitlines). In some embodiments, readout circuitry 115 may include amplification circuitry, analog-to-digital (ADC) circuitry, sample-and-hold circuitry, image buffers, or otherwise to facilitate converting an analog signal (e.g., image signals) to a digital signal (e.g., image data). Image data output by readout circuitry 115 may then be received by function logic 120. Function logic 120 is coupled to readout circuitry 115 to receive image data to de-mosaic the image data and generate one or more image frames. In some embodiments, the electrical signals and/or image data can be manipulated or otherwise processed by function logic 120 (e.g., apply post image effects such as crop, rotate, remove red eye, adjust brightness, adjust contrast, or otherwise).

Figure 1B:
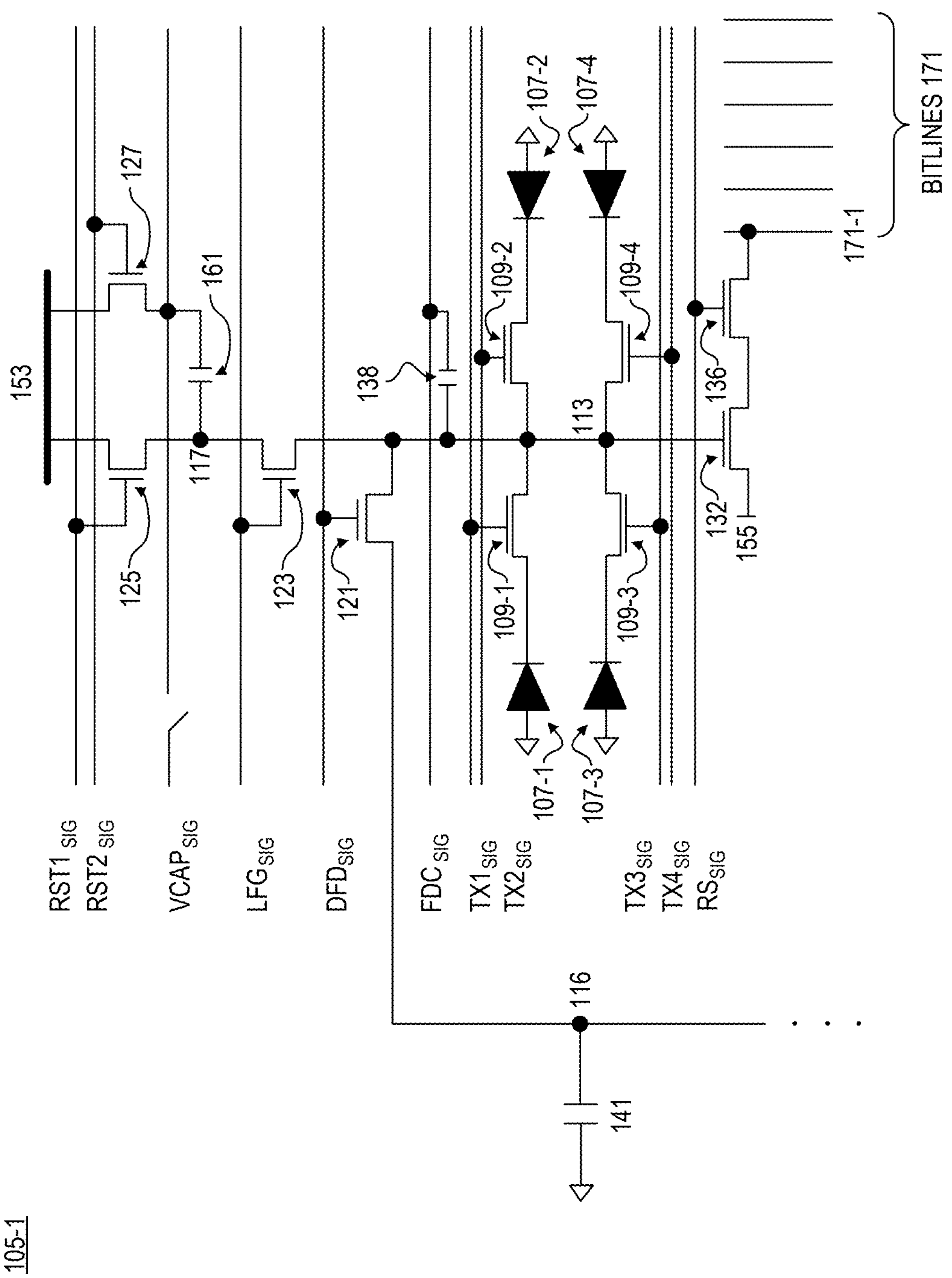
FIG. 1B illustrates an example pixel circuit for a pixel cell with a shared low conversion gain capacitor included in imaging system of FIG. 1A, in accordance with an embodiment of the disclosure.

FIG. 1B illustrates an example pixel circuit for a pixel cell 105-1 with a shared low conversion gain capacitor 141 included in imaging system 100 of FIG. 1A, in accordance with an embodiment of the disclosure. Pixel cell 105-1 may be representative of each instance of a pixel cell (e.g., P1, P2, P3, . . . , Pn) included in pixel cell array 105. In other words, multiple instances of pixel cell 105-1 may be arranged in rows and columns to form pixel cell array 105 in accordance with embodiments of the disclosure. Pixel cell 105-1 includes a first photodiode 107-1, a second photodiode 107-2, a third photodiode 107-3, a fourth photodiode 107-4, a first floating diffusion 113, a second floating diffusion 116, a third floating diffusion 117, a first transfer gate electrode 109-1 associated with a first transfer transistor, a second transfer gate electrode 109-2 associated with a second transfer transistor, a third transfer gate electrode 109-3 associated with a third transfer transistor, a fourth transfer gate electrode 109-4 associated with a fourth transfer transistor, a dual floating diffusion gate electrode 121 associated with a dual floating diffusion transistor, a lateral overflow gate electrode 123 associated with a lateral overflow transistor, a first reset gate electrode 125 associated with a first reset transistor, a second reset gate electrode 127 associated with a second reset transistor, a source-follower gate electrode 132 associated with a source-follower transistor, a row select gate electrode 136 associated with a first row select transistor, a floating diffusion capacitor 138, a shared low conversion capacitor 141, and a lateral overflow integration capacitor 161.

In the illustrated embodiment transistors associated in pixel transistor circuitry of pixel cell 105-1 may be operable (e.g., configurable to an ON or a HIGH state, an OFF or a LOW state, an intermediate state, or the like) via control signals applied (e.g., voltage or bias) or generated by control circuitry (e.g., control circuitry 110 illustrated in FIG. 1A). Control signals include a first reset control signal $RST1_{SIG}$ applied to first reset gate electrode 125, a second reset control signal $RST2_{SIG}$ applied to second reset gate electrode 127, a voltage capacitance control signal $VCAP_{SIG}$ applied to a terminal of lateral overflow integration capacitor 161, a dual floating diffusion control signal $DFD_{SIG}$ applied to dual floating diffusion gate electrode 121, a lateral overflow gate control signal $LFG_{SIG}$ applied to lateral overflow transistor 123, a floating diffusion capacitance control signal $FDC_{SIG}$ applied to a terminal of floating diffusion capacitor 138, a first transfer control signal $TX1_{SIG}$ applied to first transfer gate electrode 109-1, a second transfer control signal $TX2_{SIG}$ applied to second transfer gate electrode 109-2, a third transfer control signal $TX3_{SIG}$ applied to third transfer gate electrode 109-3, a fourth transfer control signal $TX4_{SIG}$ applied to fourth transfer gate electrode 109-4, and a row select control signal $RS_{SIG}$ applied to row select gate electrode 136.

It is appreciated that in various embodiments of the disclosure, additional or fewer components may be included in pixel cell 105-1. For example, in the illustrated embodiment, pixel cell 105-1 includes a plurality of photodiodes (e.g., first photodiode 107-1, second photodiode 107-2, third photodiode 107-3, and fourth photodiode 107-4). In some embodiments, the plurality of photodiode may be arranged in a two-by-two array. However, in other embodiments, pixel cell 105-1 may include a different configuration of photodiodes (e.g., one, two, eight, sixteen, or more photodiodes). Similarly, there may be more or fewer transfer transistors depending, for example, on the number of photodiodes included in pixel cell 105-1.

As illustrated, pixel cell 105-1 includes one or more photodiodes (e.g., first photodiode 107-1, second photodiode 107-2, third photodiode 107-3, and fourth photodiode 107-4) configured to photogenerate image charge in response to incident light. First floating diffusion 113 is coupled to receive the image charge from the one or more photodiodes through first transfer gate electrode 109-1, second transfer gate electrode 109-2, third transfer gate electrode 109-3, and fourth transfer gate electrode 109-4 (e.g., in response to transfer control signals $TX1_{SIG}$, $TX2_{SIG}$, $TX3_{SIG}$, and/or $TX4_{SIG}$). The first reset transistor (e.g., associated with first reset gate electrode 125) is coupled between a voltage source 153 and third floating diffusion 117. The second reset transistor (e.g., associated with second reset gate electrode 127) is coupled between voltage source 153 (e.g., a reset floating diffusion voltage VRFD) and lateral overflow integration capacitor 161. The lateral overflow transistor (e.g., associated with lateral overflow gate electrode 123) is coupled between first floating diffusion 113 and third floating diffusion 117. The dual floating diffusion transistor (e.g., associated with dual floating diffusion gate electrode 121) is coupled between first floating diffusion 113 and second floating diffusion 116. In some embodiments, the lateral overflow transistor associated with lateral overflow gate electrode 123 and the dual floating diffusion transistor associated with dual floating diffusion gate electrode 121 are coupled in parallel to first floating diffusion 113.

The first transfer transistor (e.g., associated with first transfer gate electrode 109-1) is coupled between first photodiode 107-1 and first floating diffusion 113. The second transfer transistor (e.g., associated with second transfer gate electrode 109-2) is coupled between second photodiode 107-2 and first floating diffusion 113. The third transfer transistor (e.g., associated with third transfer gate electrode 109-3) is coupled between third photodiode 107-3 and first floating diffusion 113. The fourth transfer transistor (e.g., associated with fourth transfer gate electrode 109-4) is coupled between fourth photodiode 107-4 and first floating diffusion 113.

Pixel cell 105-1 further includes or is otherwise associated with floating diffusion capacitor 138 coupled to first floating diffusion 113, shared low conversion gain capacitor 141 coupled to second floating diffusion 116, and lateral overflow integration capacitor 161 coupled to third floating diffusion 117. Second floating diffusion 116 is coupled between shared low conversion gain capacitor 141 and first floating diffusion 113. Third floating diffusion 117 is coupled between lateral overflow integration capacitor 161 and first floating diffusion 113. It is appreciated that floating diffusion capacitor 138, shared low conversion gain capacitor 141, and lateral overflow integration capacitor 161 are configured to store image charge overflow from each of the plurality of photodiodes included in pixel cell 105-1 (e.g., first photodiode 107-1, second photodiode 107-2, third photodiode 107-3, and fourth photodiode 107-4) during exposure or integration operation of pixel cell 105-1. It is further appreciated that floating diffusion capacitor 138 may be an optional capacitor that is utilized to provide adjustable capacitance to first floating diffusion 113 (e.g., in response to $FDC_{SIG}$). As illustrated, the dual floating diffusion transistor (e.g., associated with dual floating diffusion gate electrode 121) and the lateral overflow transistor (e.g., associated with lateral overflow gate electrode 123) are coupled in parallel with respect to first floating diffusion 113.

First floating diffusion 113 is coupled to source-follower gate electrode 132. The source-follower transistor associated with source-follower gate electrode 132 is coupled between voltage source 155 (e.g., a pixel supply voltage PIXVDD) and a bitline 171-1 included in plurality of bitlines 171. The source-follower transistor is configured to convert the image charge received at source-follower gate electrode from first floating diffusion 113, second floating diffusion 116 coupled to first floating diffusion 113, and/or third floating diffusion 117 coupled to first floating diffusion 113 based, at least in part, on dual floating diffusion control signal $DFD_{SIG}$ and lateral overflow gate control signal $LFG_{SIG}$) to a corresponding voltage signal. The row select transistor (e.g., associated with row select gate electrode 136) is configured to send the corresponding voltage signal from the source-follower transistor to the bitline included in the plurality of bitlines 171 in response to row select control signal $RS_{SIG}$.

It is appreciated that capacitance of first floating diffusion 113, second floating diffusion 116, and third floating diffusion 117 (e.g., attributed, at least in part, respectively from floating diffusion capacitor 138, shared low conversion gain capacitor 141, and lateral overflow integration capacitor 161) may have different or varying capacitance ratios. In some embodiments, first floating diffusion 113 or floating diffusion capacitor 138 has lower capacitance relative to second floating diffusion 116, shared low conversion gain capacitor 141, third floating diffusion 117, or lateral overflow integration capacitor 161. In the same or other embodiments, second floating diffusion 116 or shared low conversion gain capacitor 141 have greater capacitance relative to first floating diffusion 113 or floating diffusion capacitor 138 and second floating diffusion 116 or shared low conversion gain capacitor 141 have lower capacitance relative to third floating diffusion 117 or lateral overflow integration capacitor 161.

First floating diffusion 113, second floating diffusion 116, and third floating diffusion 117 may be utilized for different readout operational modes of pixel cell 105-1. Specifically, depending on a configuration (see, e.g., FIG. 2A) of the pixel transistor circuitry included in pixel cell 105-1, an overall full well capacity of pixel cell 105-1 may be adjusted based on total capacitance available for charge storage. In some embodiments, pixel cell 105-1 and the associated image sensor includes at least three readout modes (e.g., triple conversion gain image sensor). The at least three readout modes may include a high conversion gain mode, a low conversion gain mode, and a LOFIC conversion gain mode. The at least three modes of readout, which are arranged in order of decreasing conversion gain (e.g., conversion gain associated with the low conversion gain mode of readout is greater than conversion gain associated with the LOFIC conversion gain mode of readout but less than conversion gain associated with the high conversion gain mode). It is appreciated that conversion gain is inversely related to capacitance and full well capacity of the pixel cell 105-1. Thus, to reduce conversion gain first floating diffusion 113 may be coupled with second floating diffusion 116, and/or third floating diffusion 117 to increase an overall effective capacitance (i.e., overall full well capacity) available for image charge storage.

In some embodiments, pixel cell 105-1, or more generally the associated image sensor, may have a target conversion gain ratio between the at least three readout modes. In one embodiment, a conversion gain ratio between the high conversion gain mode and the low conversion gain mode is from 4:1 to 8:1. In other words, the high conversion gain mode may have four to eight times more conversion gain (e.g., μV/e) relative to the low conversion gain mode making the high conversion gain mode particularly suitable for low light operation. In some embodiments, the conversion gain ratio between high conversion gain mode and low conversion gain mode is configured such that the low conversion gain mode has sufficient full well capacity (i.e., total capacitance) to simultaneously store or transfer charge from each photodiode included in pixel cell 105-1 (e.g., four photodiodes as illustrated) without saturation. However, achieving the increased capacitance for the low conversion gain mode with a capacitor suitable for correlated double sampling or other multi-sampling techniques is challenging and further complicated by limited space availability. For example, a lateral overflow integration capacitor may provide enough capacitance to store image charge from four or more photodiodes, but may suffer from increased noise since a reset level or voltage is sampled during LOFIC conversion gain mode of readout after a signal level or voltage is sampled.

Embodiments of the disclosure utilize a shared low conversion gain capacitor of a given pixel cell selectively coupled to one or more nearby shared low conversion gain capacitors (e.g., from one or more row-adjacent pixel cells) to effectively increase total effective capacitance available during the low conversion gain mode of readout while still being compatible with correlated double sampling or other multisampling techniques. It is appreciated that the term "row" and "column" may be referred to interchangeably and thus elements described as "row-adjacent" may alternatively be referred to as "column-adjacent" and vice versa. Thus, in some embodiments, pixel cell 105-1 and pixel cell 105-2 may alternatively be referred to as column-adjacent depending, for example, on a configuration and/or orientation of imaging system 100. It is further appreciated that when two pixel cells are described as "row-adjacent" it means the pixel cells are positioned along a same column of a pixel cell array in adjacent rows. Similarly, when two pixel cells are described as "column-adjacent" it means the pixel cells are positioned along a same row of a pixel cell array and in adjacent columns.

Figure 1C:
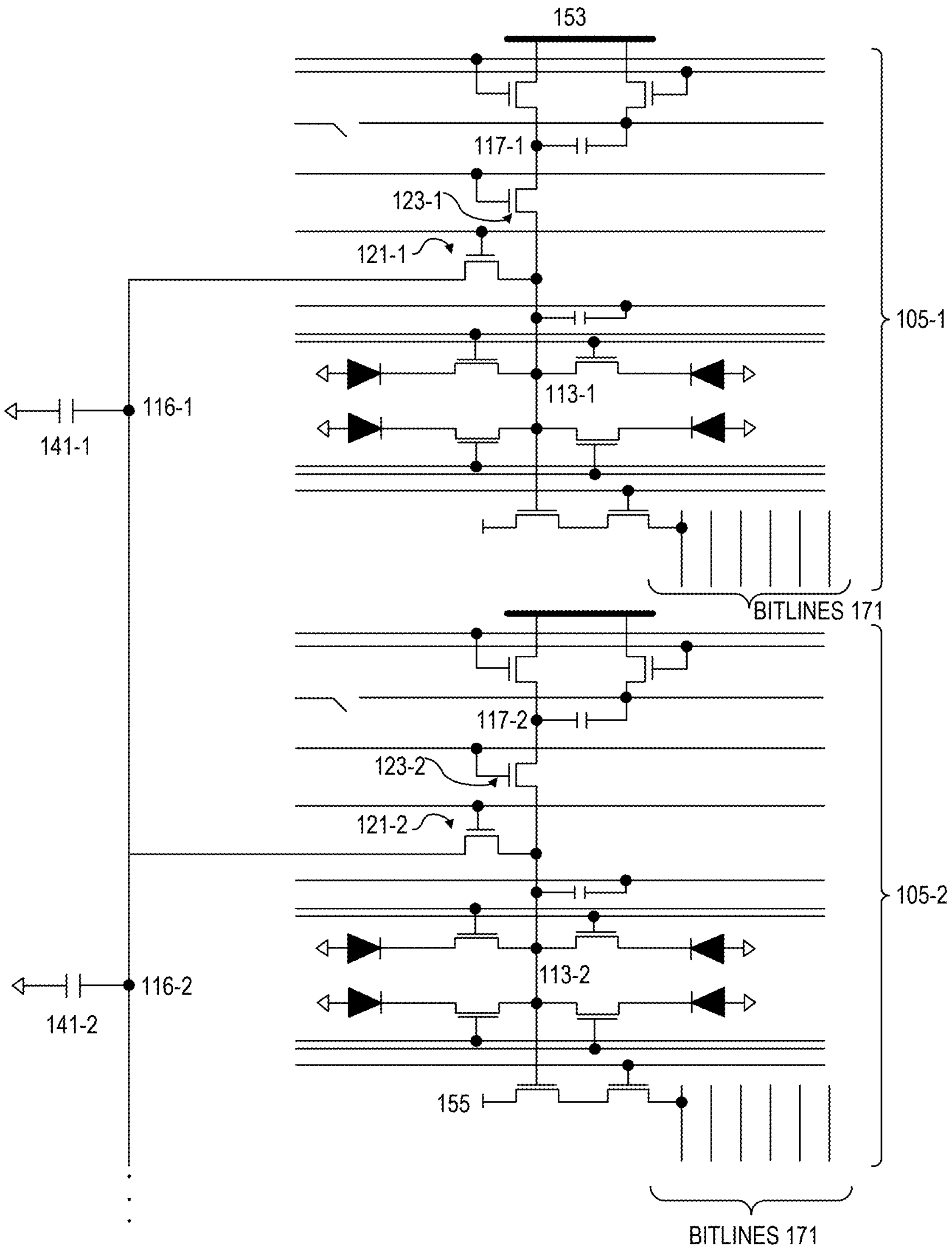
FIG. 1C illustrates example pixel circuits for pixel cells with shared low conversion gain capacitors included in the imaging system of FIG. 1A, in accordance with an embodiment of the disclosure.

FIG. 1C illustrates example pixel circuits for pixel cells 105-1 and 105-2 with shared low conversion gain capacitors 141-1 and 141-2 included in imaging system 100 of FIG. 1A, in accordance with an embodiment of the disclosure. Pixel cells 105-1 and 105-2 are included in pixel cell array 105 and are positioned adjacent to one another (e.g., row-adjacent) along a same column (e.g., pixel cell 105-1 and 105-2 may each be positioned respectively within row R1 or R2 and further positioned within column C1 of pixel cell array 105 of FIG. 1A). It is appreciated that individual components included in pixel cell 105-1 and 105-2 of FIG. 1C are not individually labeled but for first floating diffusions 113-1 and 113-2, second floating diffusions 116-1 and 116-2, third floating diffusions 117-1 and 117-2, dual floating diffusion gate electrodes 121-1 and 121-2, lateral overflow gate electrodes 123-1 and 123-2, and shared low conversion gain capacitors 141-1 and 141-2 for the sake of brevity. It is appreciated that the suffix of labeled elements (e.g., -1, -2, . . . , etc.) is indicative of associated with a given pixel cell (e.g., pixel cell 105-1, 105-2, etc.). Pixel cell 105-2 includes the same components as pixel cell 105-1 and thus reference may be made to FIG. 1B with regards to specifics of unlabeled components included in FIG. 1C or elsewhere.

In some embodiments, pixel cell 105-1 may be referred to as a first pixel cell and pixel cell 105-2 may be referred to as a second pixel cell adjacent to the first pixel cell. As illustrated, shared low conversion gain capacitor 141-1 of the first pixel cell (i.e., pixel cell 105-1) is coupled to shared low conversion gain capacitor 141-2 of the second pixel cell (i.e., pixel cell 105-2) in series. In embodiments, the dual floating diffusion transistor associated with dual floating diffusion gate electrode 121-1 of the first pixel cell (i.e., pixel cell 105-1) is coupled to the corresponding first floating diffusion 113-1 in a manner that shared low conversion gain capacitor 141-1 of the first pixel cell (i.e., pixel cell 105-1) and shared low conversion gain capacitor 141-2 of the second pixel cell (i.e., pixel cell 105-2) are connected in series and collectively connected in parallel to the first floating diffusion 113-1. By coupling nearby shared low conversion gain capacitors (e.g., shared low conversion gain capacitors 141-1 and 141-2) to first floating diffusion (e.g., first floating diffusion 113-1), full well capacity for low conversion gain readout operation may be modulated or otherwise adjusted (e.g., the dual floating diffusion transistor associated with dual floating diffusion gate electrode 121-1 of pixel cell 105-1 is turned on while the dual floating diffusion transistor associated with the dual floating diffusion gate electrode 121-2 of pixel cell 105-2 is turned off to decouple the shared low conversion gain capacitor 141-2 from first floating diffusion 113-2) to meet target requirements (e.g., a target conversion gain ratio between the high conversion gain mode and low conversion gain readout mode for high dynamic range imaging application). The control of capacitance through design of the low conversion gain capacitors (e.g., metal-oxide-metal capacitors that may be interdigitated or now) in combination with sharing the low conversion gain capacitors of adjacent or nearby pixel cells enables more granular control of conversion gain between different readout modes. In other words, the ratio of conversion gain for readout between high conversion gain mode, low conversion gain mode, and LOFIC conversion gain mode may be adjusted to have smoother transition between readout modes (e.g., the change in signal to noise ratio when transitioning between different readout modes may be reduced).

Figure 1D:
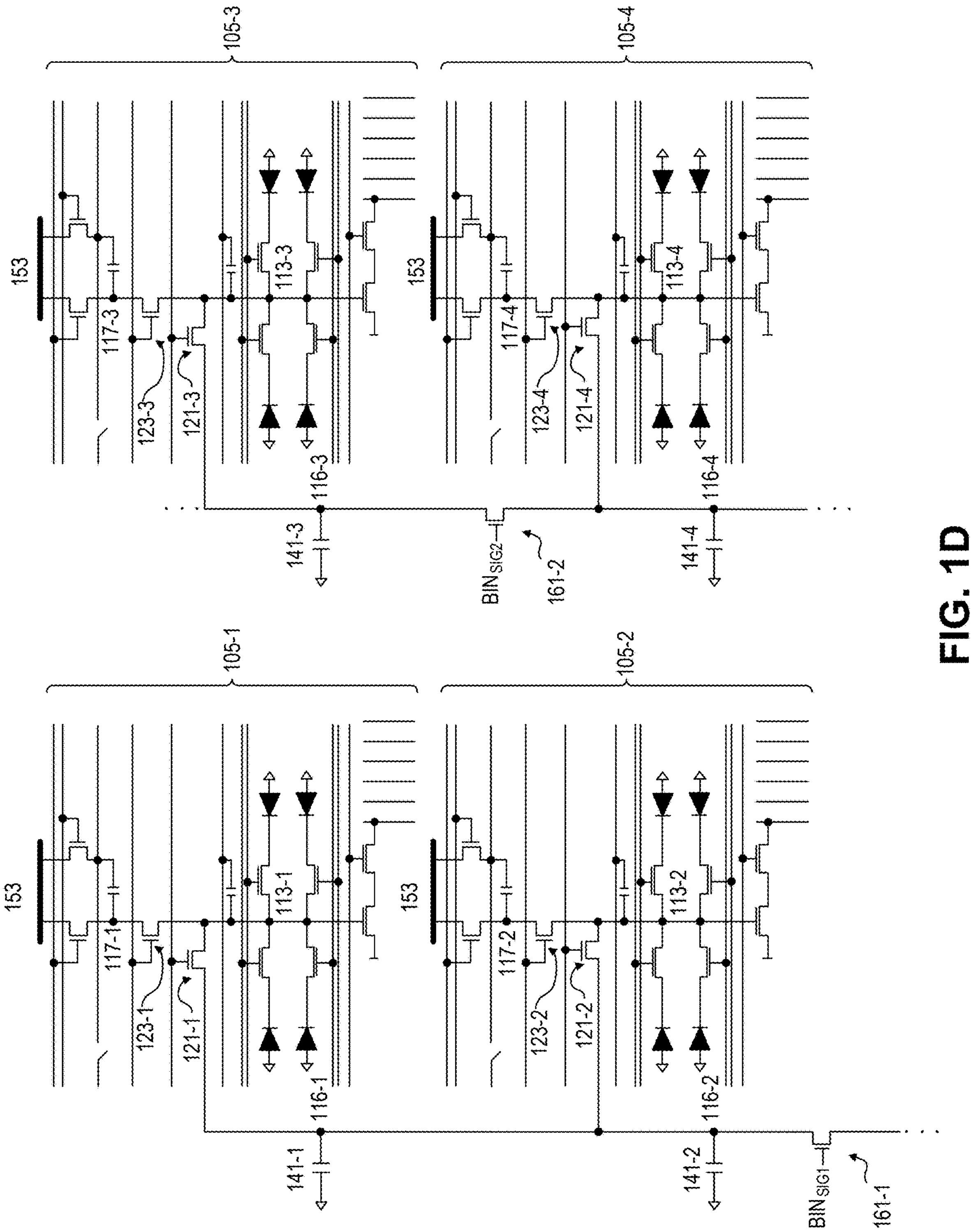
FIG. 1D illustrates example pixel circuits for pixel cells with shared low conversion gain capacitors included in the imaging system of FIG. 1A, in accordance with an embodiment of the disclosure.

FIG. 1D illustrates example pixel circuits for pixel cells 105-1, 105-2, 105-3, and 105-4 with shared low conversion gain capacitors 141-1, 141-2, 141-3, and 141-4 included in imaging system 100 of FIG. 1A, in accordance with an embodiment of the disclosure. Pixel cells 105-1, 105-2, 105-3, and 105-4 are included in pixel cell array 105 and are positioned along a same column (e.g., pixel cells 105-1, 105-2, 105-3, and 105-4 may respectively be positioned in rows R1, R2, R3, and R4 of column C1 of pixel cell array 105 of FIG. 1A) to form a four-by-one pixel cell array. It is appreciated that individual components included in pixel cells 105-1, 105-2, 105-3, and 105-4 of FIG. 1D are not individually labeled but for shared low conversion gain capacitors 141-1, 141-2, 141-3, and 141-4, first floating diffusions 113-1, 113-2, 113-3, and 113-4, second floating diffusions 116-1, 116-2, 116-3, and 116-4, third floating diffusions 117-1, 117-2, 117-3, and 117-4, dual floating diffusion transistors associated with dual floating diffusion gate electrodes 121-1, 121-2, 121-3, and 121-4 lateral overflow transistors associated with lateral overflow gate electrodes 123-1, 123-2, 123-3, and 123-4, and voltage sources 153 and 155, for the sake of brevity. Pixel cells 105-2, 105-3, and 105-4 include the same components as pixel cell 105-1 and thus reference may be made to FIG. 1B within regards to specifics of individual pixel cells included in pixel cell array 105.

In the illustrated embodiment, shared low conversion gain capacitors 141-1, 141-2, 141-3, and 141-4 of pixel cells 105-1, 105-2, 105-3, and 105-4 may be selectively coupled or shared to provide variable control of capacitance (i.e., full well capacity) for a corresponding pixel cell during low conversion gain mode of imaging system 100 via one or more binning transistors coupled between the shared low conversion gain capacitors. For example, a first binning transistor 161-1 is coupled between shared low conversion gain capacitors 141-2 and 141-3. Similarly, a second binning transistor 161-2 is coupled between shared low conversion gain capacitors 141-3 and 141-4. First binning transistor 161-1 and second binning transistor 161-2 may be operable to respective binning signals $BIN_{SIG1}$ and $BIN_{SIG2}$ applied to corresponding gate electrodes of first binning transistor 161-1 and second binning transistor 161-2.

Figure 2A:
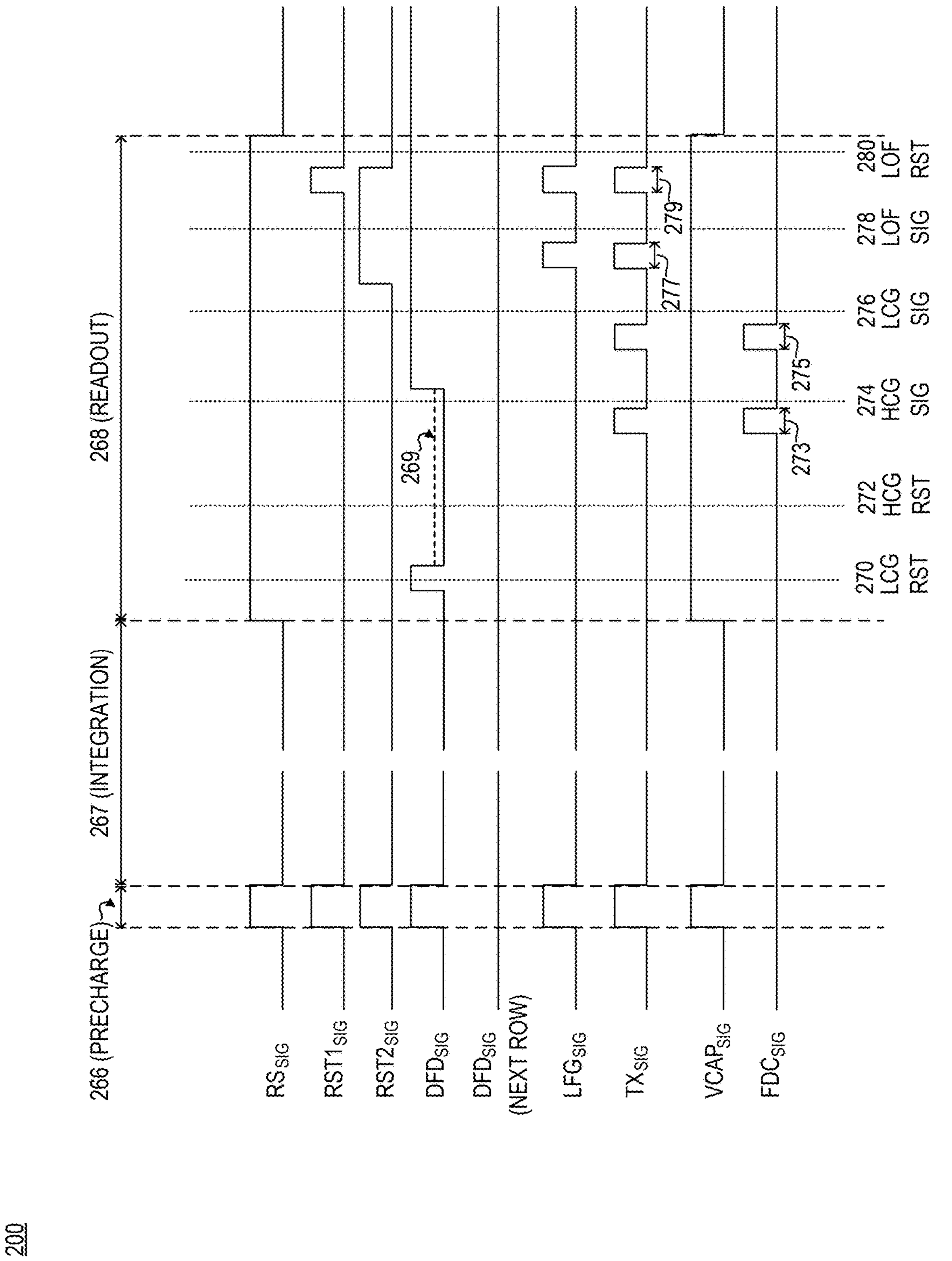
FIG. 2A illustrates a timing diagram for readout of a pixel cell with a shared low conversion gain capacitor, in accordance with an embodiment of the disclosure.

FIG. 2A illustrates a timing diagram 200 for readout of a pixel cell with a shared low conversion gain capacitor, in accordance with an embodiment of the disclosure. Timing diagram 200 may be representative of operation for a pixel cell included in pixel cell array 105 of imaging system 100 illustrated in FIG. 1A. In some embodiments, timing diagram 200 is representative of operation for pixel cell 105-1 having shared low conversion gain capacitor 141-1 coupled to shared low conversion gain capacitor 141-2 of an row-adjacent pixel cell 105-2 illustrated in FIG. 1B-1C. Timing diagram 200 illustrates row select control signal $RS_{SIG}$, first reset control signal $RST1_{SIG}$, second reset control signal $RST2_{SIG}$, dual floating diffusion control signal $DFD_{SIG}$, lateral overflow gate control signal $LFG_{SIG}$, a transfer control signal $TX_{SIG}$, voltage capacitance control signal $VCAP_{SIG}$, and floating diffusion capacitance control signal $FDC_{SIG}$ that control operation of pixel cell 105-1. Timing diagram 200 further includes a dual floating diffusion control signal $DFD_{SIG}$ (NEXT ROW) for a row-adjacent pixel cell (e.g., pixel cell 105-2 illustrated in FIG. 1C-1D) that has a shared low conversion gain capacitor coupled to the shared low conversion gain capacitor of pixel cell 105-1 (e.g., shared low conversion gain capacitors 141-2 of pixel cell 105-2 coupled to shared low conversion gain capacitors 141-1 of pixel cell 105-1 illustrated in FIG. 1C-1D). It is appreciated that the control signals illustrated in FIG. 2A may be coupled to gate electrodes or capacitor terminals as discussed in context of FIG. 1A-1D. It is further appreciated that transfer control signal $TX_{SIG}$ is representative of control for any combination of transfer transistors illustrated in FIG. 1B (e.g., $TX_{SIG}$ included in timing diagram 200 may be representative of first transfer control signal $TX1_{SIG}$, second transfer control signal $TX2_{SIG}$, third transfer control signal $TX3_{SIG}$, fourth transfer control signal $TX4_{SIG}$, or any combination of transfer control signals illustrated in FIG. 1B or otherwise in accordance with embodiments of the disclosure depending on how many photodiodes of pixel cell 105-1 are being readout).

Timing diagram 200 illustrates a precharge period 266 to configure components of pixel cell 105-1 to one or more predetermined voltage levels (e.g., based on voltage source 153, voltage source 155, a voltage associated with the floating diffusion signal $FDC_{SIG}$, a voltage associated with $VCAP_{SIG}$, or combinations thereof), an integration period 267 for photodiodes (e.g., one or more photodiodes such as first photodiode 107-1, second photodiode 107-2, third photodiode 107-3, fourth photodiode 107-4, or combinations thereof) to accumulate image charge in response to incident light, and a readout period 268 to sample reset and signal levels or voltages at one or more conversion gain modes such as a high conversion gain mode, a low conversion gain mode, and/or a LOFIC conversion gain mode.

The illustrated embodiment of timing diagram 200 shows correlated double sampling in which reset levels or voltages are subtracted from corresponding signal levels or voltages (e.g., using analog-to-digital circuitry included in readout circuitry 115 of imaging system 100 illustrated in FIG. 1A) for a given conversion gain mode included in readout period 268. Timing diagram 200 shows examples of when to sample or sense a level or voltage during readout period 268 for the high conversion gain mode that corresponds to a first effective capacitance, the low conversion gain mode that corresponds to a second effective capacitance, and the LOFIC conversion gain mode included in readout period 268 that corresponds to a third effective capacitance. The second effective capacitance is greater than the first effective capacitance but less than the third effective capacitance. In some embodiments, the second effective capacitance is greater than or equal to an overall full well capacity of the plurality of photodiodes included in the respective pixel cell (e.g., all photodiodes included in the respective pixel cell). The high conversion gain mode includes times 272 and 274 for examples of when to sample a high conversion reset level (HCG RST) and a high conversion signal level (HCG SIG) for subsequent correlated double sampling operations. The low conversion gain mode includes times 270 and 276 for when to sample a low conversion reset level (LCG RST) and low conversion signal level (LCG SIG) for subsequent correlated double sampling operations. The LOFIC conversion gain mode includes a LOFIC signal level (LOF SIG) and a LOFIC reset level (LOF RST). As illustrated, low conversion reset level LCG RST is sampled before high conversion reset level HCG RST. In the same or other embodiments, high conversion signal level HCG SIG is sampled before low conversion signal level LCG SIG. LOFIC conversion gain mode occurs after low conversion gain mode and high conversion gain mode such that LOFIC signal level LOF SIG and the LOFIC reset level LOF RST are sampled after reset and signal levels are sampled for the high conversion gain mode and low conversion gain mode. In the illustrated embodiment, the reset signal levels for the high conversion gain mode and low conversion gain mode (e.g., low conversion reset level LCG RST and high conversion reset level HCG RST) are sampled before respective signal levels are sampled (e.g., low conversion signal level LCG SIG and high conversion signal level HCG SIG). In the same or other embodiments, during the LOFIC conversion gain mode, the LOFIC signal level LOF SIG is sampled before the LOFIC reset level LOF RST is sampled such that LOFIC signal is not reset before readout.

Timing diagram 200 shows the dual floating diffusion control signal $DFD_{SIG}$ (NEXT ROW) associated with the dual floating diffusion transistor of row-adjacent pixel cells that have coupled shared low conversion gain capacitors configured to be off or at a low level during each of precharge period 266, integration period 267, and readout period 268 for the pixel cell being readout in order to inhibit color signal mixing. For example, referring to FIG. 1C, during readout of pixel cell 105-1 (i.e., a first pixel cell), the dual floating diffusion transistor 121-2 associated with pixel cell 105-2 (i.e., a second pixel cell) included on a next row adjacent to pixel cell 105-1 is configured to be off (e.g., via a corresponding dual floating diffusion control signal provided by control circuitry) during precharge, integration, and readout (e.g., including during at least a high conversion gain mode and a low conversion gain mode) of pixel cell 105-1 to prevent mixing of signals between the different pixel cells. Put in another way, readout for a group of pixel cells with shared (i.e., coupled) low conversion gain capacitors occurs on a pixel-by-pixel basis such that one pixel cell at a time is readout at a time (e.g., readout of pixel cell 105-2 is inactive during readout of pixel cell 105-1 and conversely readout of pixel cell 105-1 is inactive during readout of pixel cell 105-2). Referring back to FIG. 2A, in some embodiments an off voltage for the dual floating diffusion transistor of the second pixel cell (e.g., based on dual floating diffusion control signal $DFD_{SIG}$ (NEXT ROW)) is lower than an off voltage for the dual floating diffusion transistor of the first pixel cell (e.g., based on dual floating diffusion control signal $DFD_{SIG}$) during the integration period 267 and/or readout period 268 for the first pixel cell, which has the benefit of reducing crosstalk.

In some embodiments, an off voltage applied to gate electrodes for the transfer transistors, the dual floating diffusion transistor, the lateral overflow transistor, and the reset transistor(s) when operating pixels cells (e.g., based on timing diagram 200) included in the image sensor may have a predetermined relationship based, for example, on threshold voltage implants for the aforementioned transistors to facilitate overflow from the first floating diffusion (e.g., first floating diffusion 113 of FIG. 1B) to the second floating diffusion (e.g., second floating diffusion 116 of FIG. 1B). In one embodiment, the dual floating diffusion transistor (e.g., associated with dual floating diffusion gate electrode 121 of FIG. 1B) and the transfer transistors (e.g., associated with one or more of first transfer gate electrode 109-1, second transfer gate electrode 109-2, third transfer gate electrode 109-3, and/or fourth transfer gate electrode 109-4 of FIG. 1B) have the same threshold voltage implants. In such an embodiment a first off voltage (e.g., a negative voltage) applied to the gate electrodes of the transfer transistors and dual floating diffusion transistor (e.g., based on $DFD_{SIG}$ and $TX_{SIG}$ in FIG. 2A) is less than a second off voltage (e.g., 0 V) applied to gate electrodes of the lateral overflow transistor and the reset transistors (e.g., based on $LFG_{SIG}$, $RST1_{SIG}$, and $RST2_{SIG}$ in FIG. 2A) during precharge period 266, integration period 267, and/or readout period 268. In another embodiment, the lateral overflow transistor (e.g., associated with lateral overflow gate electrode 123 of FIG. 1B) and the transfer transistors (e.g., associated with one or more of first transfer gate electrode 109-1, second transfer gate electrode 109-2, third transfer gate electrode 109-3, and/or fourth transfer gate electrode 109-4 of FIG. 1B) have the same threshold voltage implants. In such an embodiment the first off voltage (e.g., a negative voltage less than 0 V) applied to the gate electrode of the dual floating diffusion transistor (e.g., based on $DFD_{SIG}$ in FIG. 2A) is less than the second off voltage (e.g., zero volt or positive voltage) applied to the lateral overflow transistor, the transfer transistors, and the reset transistors (e.g., based on $LFG_{SIG}$, $TX_{SIG}$, $RST1_{SIG}$, and $RST2_{SIG}$ in FIG. 2A) during precharge period 266, integration period 267, and/or readout period 268.

In some embodiments, during a precharge period, an integration period subsequent to the precharge period, or a readout period subsequent to the integration period for the first pixel cell, control circuitry is configured to apply a first off voltage to a dual floating diffusion gate included in the dual floating diffusion transistor of the first pixel cell and a second off voltage to a lateral overflow gate electrode included in the lateral overflow transistor of the first pixel cell. In some embodiments, the first off voltage (e.g., a negative voltage) is less than the second off voltage (e.g., 0 V or a positive voltage). In some embodiments, the control circuitry is configured to apply an off voltage (e.g., 0 V or a negative voltage that turns off the dual floating diffusion transistor), an intermediate voltage (e.g., a positive voltage such as great than 0 V but less than 2 V), and an on voltage (e.g., 2.2 V to 3.6 V) to the dual floating diffusion gate electrode included in the dual floating diffusion transistor of the first pixel cell respectively during an integration period (e.g., integration period 267 of FIG. 2A), a high conversion gain mode of readout (e.g., coinciding with period 269), and/or a low conversion gain mode of readout (e.g., coincident with when the low conversion reset level and low conversion signal levels are sampled) for the first pixel cell.

In some embodiments, the intermediate voltage and the on voltage are each positive voltage levels and the on voltage is greater than the intermediate voltage.

As illustrated, during precharge period 266 components associated with row select control signal $RS_{SIG}$, first reset control signal $RST1_{SIG}$, second reset control signal $RST2_{SIG}$, dual floating diffusion control signal $DFD_{SIG}$, dual floating diffusion control signal $DFD_{SIG}$ (NEXT ROW), lateral overflow gate control signal $LFG_{SIG}$, transfer control signal $TX_{SIG}$, and voltage capacitance control signal $VCAP_{SIG}$ each configured to be in an on or high state while the capacitor associated with floating diffusion capacitance control signal $FDC_{SIG}$ is configured to be in a low state. During integration period 267, components associated with row select control signal $RS_{SIG}$, first reset control signal $RST1_{SIG}$, second reset control signal $RST2_{SIG}$, dual floating diffusion control signal $DFD1_{SIG}$, dual floating diffusion control signal $DFD_{SIG}$ (NEXT ROW), lateral overflow gate control signal $LFG_{SIG}$, transfer control signal $TX_{SIG}$, voltage capacitance control signal $VCAP_{SIG}$, and floating diffusion capacitance control signal $FDC_{SIG}$ are each configured to an off or low state.

During readout period 268, components associated with the various control signals of timing diagram 200 depends on the mode of readout (e.g., high conversion gain mode, low conversion gain mode, and LOFIC conversion gain mode) for a given pixel cell (e.g., a first pixel cell). But it is noted that the dual floating diffusion transistor for coupled pixel cells (e.g., pixel cells having shared low conversion gain capacitors coupled to the shared low conversion gain capacitor of the given cell) is configured to be in an off or low state during an entire duration of readout period 268 (e.g., during the low conversion mode, the high conversion mode, and the LOFIC conversion mode) as indicated by dual floating diffusion control signal $DFD_{SIG}$ (NEXT ROW). It is further noted that in some embodiments, the row select transistor associated with row select control signal $RS_{SIG}$ and the floating diffusion capacitor associated with voltage capacitance control signal $VCAP_{SIG}$ are each configured to be in an on or high state during an entire duration of readout period 268 (e.g., during the low conversion mode, the high conversion mode, and the LOFIC conversion mode).

During high conversion gain mode associated with readout period 268, components associated with row select control signal $RS_{SIG}$ and voltage capacitance control signal $VCAP_{SIG}$ are each configured to be in an on or high state while components associated with first reset control signal $RST1_{SIG}$, second reset control signal $RST2_{SIG}$, dual floating diffusion control signal $DFD_{SIG}$, dual floating diffusion control signal $DFD_{SIG}$ (NEXT ROW), lateral overflow gate control signal $LFG_{SIG}$, transfer control signal $TX_{SIG}$, and floating diffusion capacitance control signal $FDC_{SIG}$ are each configured to an off or low state when sampling high conversion reset level HCG RST.

During high conversion gain mode associated with readout period 268, a first pulse 273 occurs in which components associated with transfer control signal $TX_{SIG}$ and floating diffusion capacitance control signal $FDC_{SIG}$ are each configured to be pulsed on (e.g., configured to be in an on or high state for a predetermined period of time and then configured to be in an off or low state) while components associated with first reset control signal $RST1_{SIG}$, second reset control signal $RST2_{SIG}$, dual floating diffusion control signal $DFD_{SIG}$, dual floating diffusion control signal $DFD_{SIG}$ (NEXT ROW), and lateral overflow gate control signal $LFG_{SIG}$ are each configured to an off or low state to transfer image charge from the photodiodes of the active pixel cell to the floating diffusion (e.g., first floating diffusion 113 illustrated in FIG. 1B). After the image charge transfer (e.g., first pulse 273), time 274 occurs, which corresponds to an example of when to sample high conversion signal level HCG SIG. It is noted that having components associated with the dual floating diffusion control signal $DFD_{SIG}$ configured to an off or intermediate state, dual floating diffusion control signal $DFD_{SIG}$ (NEXT ROW), and lateral overflow gate control signal $LFG_{SIG}$ configured to an off or low state disconnects the first floating diffusion of the corresponding pixel cell from the shared low conversion gain capacitors and the lateral overflow integration capacitor.

During the low conversion gain mode associated with readout period 268, components associated with row select control signal $RS_{SIG}$, dual floating diffusion control signal $DFD_{SIG}$, and voltage capacitance control signal $VCAP_{SIG}$ are each configured to be in an on or high state while components associated with first reset control signal $RST1_{SIG}$, second reset control signal $RST2_{SIG}$, dual floating diffusion control signal $DFD_{SIG}$ (NEXT ROW), lateral overflow gate control signal $LFG_{SIG}$, transfer control signal $TX_{SIG}$, and floating diffusion capacitance control signal $FDC_{SIG}$ are each configured to an off or low state when sampling low conversion reset level LCG RST.

During the low conversion gain mode associated with readout period 268, a second pulse 275 occurs in which components associated with transfer control signal $TX_{SIG}$ and floating diffusion capacitance control signal $FDC_{SIG}$ are each configured to be pulsed on (e.g., configured to be in an on or high state for a predetermined period of time and then configured to be in an off or low state) while the dual floating diffusion transistor associated with dual floating diffusion control signal $DFD_{SIG}$ is configured to be in the on or high state and components associated with first reset control signal $RST1_{SIG}$, second reset control signal $RST2_{SIG}$, dual floating diffusion control signal $DFD_{SIG}$ (NEXT ROW), and lateral overflow gate control signal $LFG_{SIG}$ are each configured to an off or low state to transfer image charge from the photodiodes of the active pixel cell to the floating diffusion (e.g., combination of both first floating diffusion 113 and second floating diffusion 116 illustrated in FIG. 1B). After the image charge transfer (e.g., second pulse 275), time 276 occurs, which corresponds to an example of when to sample low conversion signal level LCG SIG.

During LOFIC conversion gain mode associated with readout period 268, a third pulse 277 occurs in which components associated with lateral overflow gate control signal $LFG_{SIG}$ and transfer control signal $TX_{SIG}$ are each configured to be pulsed on (e.g., configured to be in an on or high state for a predetermined period of time and then configured to be in an off or low state) while components associated with second reset control signal $RST2_{SIG}$ and dual floating diffusion control signal $DFD_{SIG}$ are configured to be in an on or high state and components associated with first reset control signal $RST1_{SIG}$, dual floating diffusion control signal $DFD_{SIG}$ (NEXT ROW), and floating diffusion capacitance control signal $FDC_{SIG}$ are each configured to an off or low state to transfer image charge from the photodiodes of the active pixel cell to the floating diffusion (e.g., the combination of first floating diffusion 113, second floating diffusion 116, and third floating diffusion 117 illustrated in FIG. 1B). After the image charge transfer (e.g., the third pulse 277), time 278 occurs, which corresponds to an example of when to sample LOFIC signal level LOF SIG.

During LOFIC conversion gain mode associated with readout period 268, a fourth pulse 279 occurs in which components associated with first reset control signal $RST1_{SIG}$, lateral overflow gate control signal $LFG_{SIG}$, and transfer control signal $TX_{SIG}$ are each configured to be pulsed on (e.g., configured to be in an on or high state for a predetermined period of time and then configured to be in an off or low state) while components associated with second reset control signal $RST2_{SIG}$ and dual floating diffusion control signal $DFD_{SIG}$ are configured to be in an on or high state and components associated with dual floating diffusion control signal $DFD_{SIG}$ (NEXT ROW) and floating diffusion capacitance control signal $FDC_{SIG}$ are each configured to an off to perform a reset operation of stored image charge. It is appreciated the component associated with the second reset control signal $RST2_{SIG}$ may be configured to be in the off or low state at the same time fourth pulse 279 terminates (e.g., when components associated with the first reset control signal $RST1_{SIG}$, lateral overflow gate control signal $LFG_{SIG}$, and transfer control signal $TX_{SIG}$ are configured to be in the off or low state). After the reset operation, time 280 occurs, which corresponds to an example of when to sample LOFIC reset level LOF RST.

In some embodiments, the dual floating diffusion transistor associated with dual floating diffusion control signal $DFD_{SIG}$ is configured to an intermediate level (e.g., based on an applied intermediate voltage) during high conversion gain mode of readout for pixel cell 105-1 corresponding to period 269 to configure a barrier potential to promote image charge overflowing from the first floating diffusion (e.g., first floating diffusion 113 in FIG. 1B) to the second floating diffusion (e.g., second floating diffusion 116 in FIG. 1B) associated with the shared low conversion gain capacitor (e.g., shared low conversion gain capacitor 141 in FIG. 1B) rather than the third floating diffusion (e.g., third floating diffusion 117 in FIG. 1B) associated with the lateral overflow integration capacitor (e.g., lateral overflow integration capacitor 161). It is appreciated the intermediate level or voltage applied to the dual floating diffusion gate electrode 121 associated with a dual floating diffusion transistor during high conversion gain mode readout may be selected in reference to a biasing voltage (e.g., an off voltage of 0 V or less) of lateral overflow gate electrode (e.g., lateral overflow gate electrode 123) associated with lateral overflow transistor such that a potential barrier associated with dual floating diffusion transistor is lower than a potential barrier associated with lateral overflow transistor. The intermediate level is achieved by applying a voltage (e.g., a positive voltage ranging greater than an off voltage (e.g., 0 V or less) of the dual floating diffusion transistor but less than a fully on voltage of the dual floating diffusion transistor such as a positive voltage ranging from 2.8 V to 3.6 V that enables charge readout via dual floating diffusion control signal $DFD_{SIG}$. In some embodiments, a first voltage (e.g., the intermediate voltage) applied to the dual floating diffusion gate electrode of the dual floating diffusion transistor is greater than a second voltage (e.g., an off voltage) applied to the lateral overflow gate electrode of the lateral overflow transistor during a high conversion gain mode of readout for a given pixel cell (e.g., a first pixel cell). Accordingly, the dual floating diffusion transistor may be considered to be partially on during period 269 or otherwise characterized as having a lower potential barrier to overflow image charge relative to a corresponding potential barrier associated with the lateral overflow transistor.

Figure 2B:
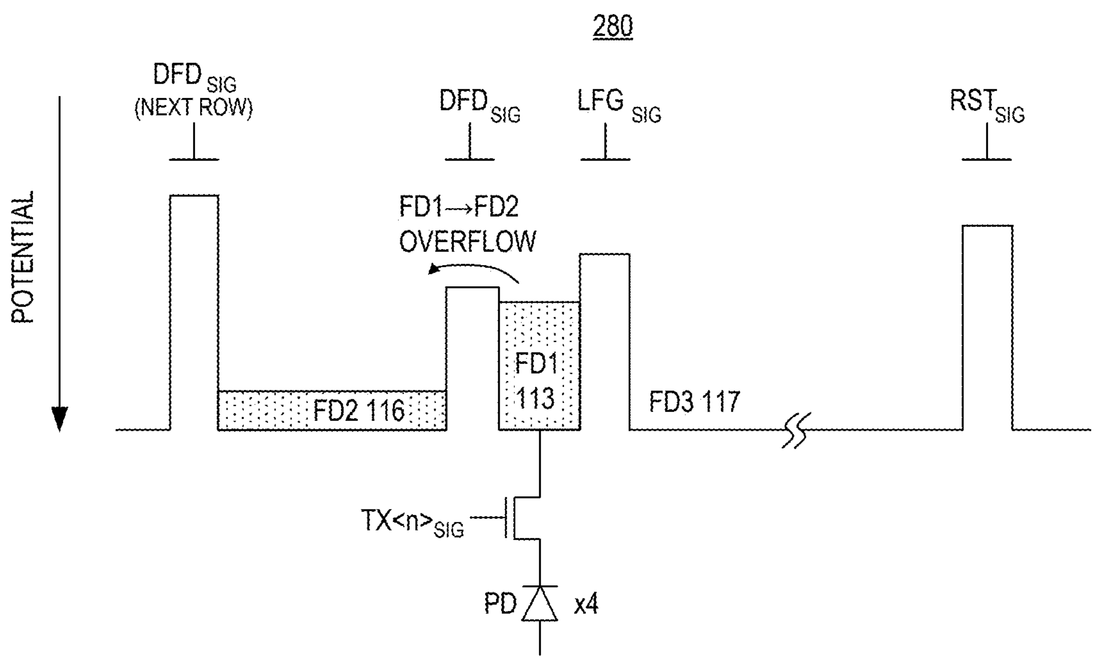
FIG. 2B illustrates a potential diagram for a pixel cell with a shared low conversion gain capacitor during high conversion gain mode of readout, in accordance with an embodiment of the disclosure.

FIG. 2B illustrates a potential diagram 280 for a pixel cell with a shared low conversion gain capacitor during high conversion gain mode of readout, in accordance with an embodiment of the disclosure. Potential diagram 280 is one possible representation of high conversion signal level (HCG SIG) readout or sampling when the dual floating diffusion transistor of the pixel cell being readout is configured to the intermediate level via dual floating diffusion control signal $DFD_{SIG}$ (e.g., as illustrated by the dashed line during time period 269 of timing diagram 200 illustrated in FIG. 2A). As illustrated, the potential barrier associated with the dual floating diffusion transistor (e.g., based on dual floating diffusion control signal $DFD_{SIG}$) is less than the potential barrier associated with the lateral overflow transistor (e.g., based on lateral overflow gate control signal $LFG_{SIG}$) while the dual floating diffusion gate electrode of the dual floating diffusion transistor is biased at the intermediate level and the lateral overflow transistor is biased to be in the off state (e.g., an off voltage such as 0 V or less). Since the potential barrier associated with the dual floating diffusion transistor coupled to the second floating diffusion 116 is less than the potential barrier associated with the lateral overflow transistor coupled to the third floating diffusion 117, image charge may thus overflow (e.g., upon saturation of the first floating diffusion) from the first floating diffusion 113 to the second floating diffusion 116. By directing the overflow image charge to the second floating diffusion, the overflow image charge may be readout during low conversion gain mode of readout.

In the same or other embodiments, the potential barrier associated with the dual floating diffusion transistor of adjacent pixel cells with shared low conversion gain capacitors coupled to the shared low conversion gain capacitor of the active pixel cell (e.g., based on the configuration of dual floating diffusion control signal $DFD_{SIG}$ (NEXT ROW)) is greater than the potential barrier associated with the lateral overflow transistor (e.g., based on the configuration of the lateral overflow gate control signal $LFG_{SIG}$). In one embodiment, an off voltage (e.g., a negative voltage) applied to the dual floating diffusion transistor of adjacent pixel cells with shared low conversion gain (e.g., based on dual floating diffusion control signal $DFD_{SIG}$ (NEXT ROW)) is less than an off voltage (e.g., 0 V) applied to the lateral overflow gate electrode (e.g., based on lateral overflow gate control signal $LFG_{SIG}$) to fully turn off the dual floating diffusion transistor of adjacent pixel cells with shared low conversion gain capacitors.

Figure 2C:
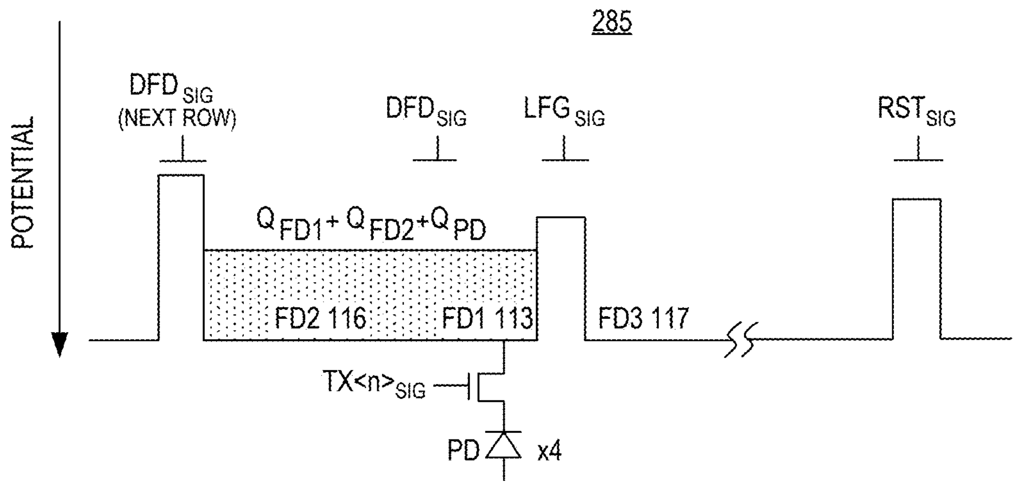
FIG. 2C illustrates a potential diagram for a pixel cell with a shared low conversion gain capacitor during a low conversion gain mode of readout, in accordance with an embodiment of the disclosure.

FIG. 2C illustrates a potential diagram 285 for a pixel cell with a shared low conversion gain capacitor during a low conversion gain mode of readout, in accordance with an embodiment of the disclosure. Potential diagram 285 is one possible representation of low conversion signal level (LCG SIG) readout or sampling when the dual floating diffusion transistor of the pixel cell being readout is configured to the high state via dual floating diffusion control signal $DFD_{SIG}$ (e.g., as illustrated at time 276 of timing diagram 200 illustrated in FIG. 2A). As illustrated, when the dual floating diffusion transistor is turned on fully (e.g., by a on voltage such as a positive voltage that is greater than the intermediate voltage corresponding to the intermediate level, for example, a positive voltage greater than or equal to 2.8V), the first floating diffusion is coupled to the second floating diffusion such that full well capacity of the pixel cell being readout is based on the combination of the one or more photodiodes, the first floating diffusion, and the second floating diffusion.

It is appreciated that in the context of at least FIG. 2B and FIG. 2C, the dual floating diffusion transistor of the first pixel cell is configured to be on (e.g., partially on such as an intermediate level) during the high conversion gain mode of readout (e.g., an intermediate voltage applied via dual floating diffusion control signal $DFD_{SIG}$ illustrated in FIG. 2B) and further configured to be fully on (e.g., at a high level) during the low conversion gain mode of readout (e.g., an on voltage or a fully on voltage for the dual floating diffusion transistor such as greater than or equal to 2.8V). Accordingly, in some embodiments, the intermediate voltage applied to the gate electrode of the dual floating diffusion transistor during the high conversion gain mode of readout is less than the on voltage applied to the gate electrode of the dual floating diffusion transistor during the low conversion gain mode of readout, but both the intermediate voltage and the on voltage are each positive voltage levels.

Figure 3A:
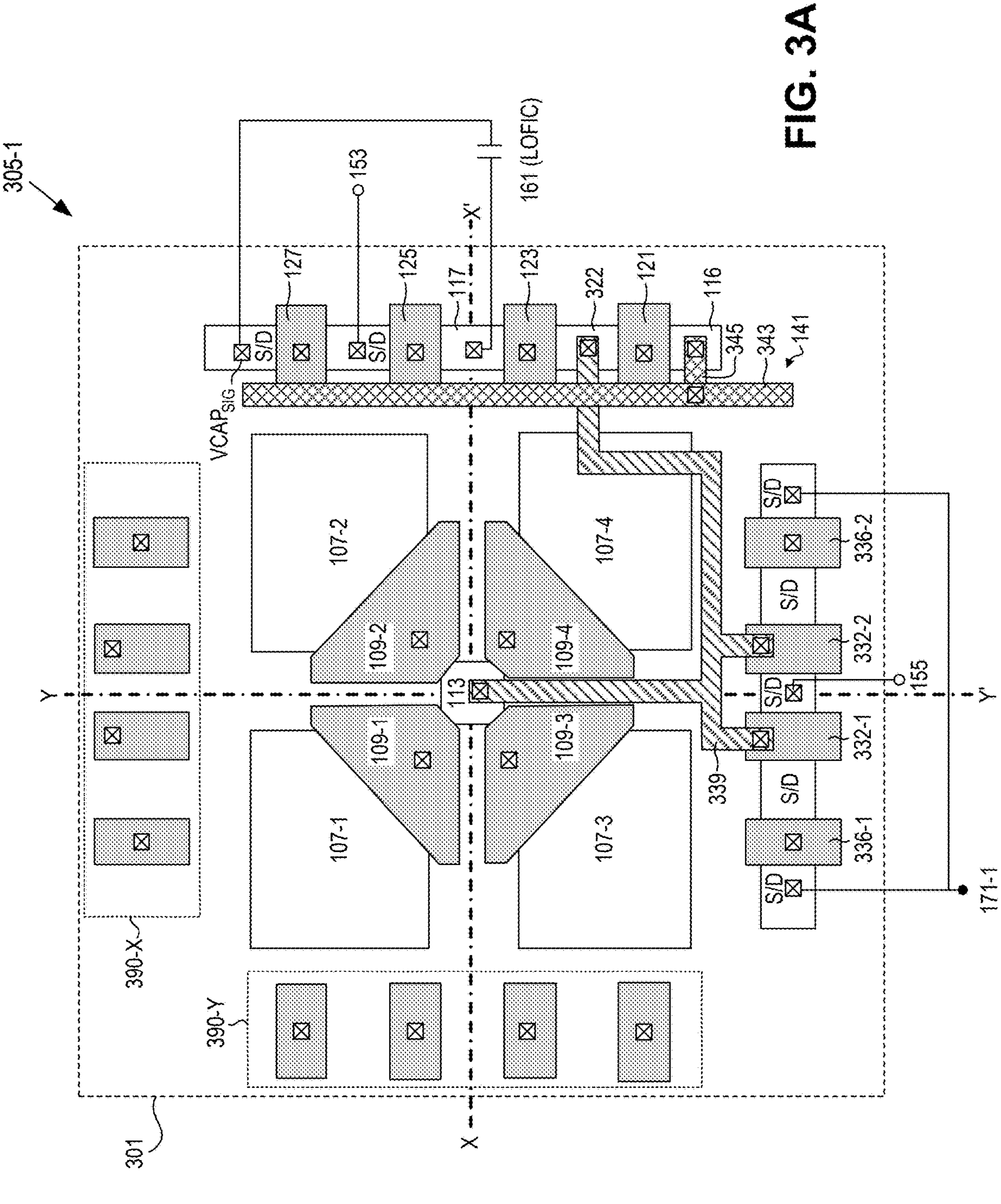
FIG. 3A illustrates a plan view of a pixel cell with a shared low conversion gain capacitor, in accordance with an embodiment of the disclosure.

FIG. 3A illustrates a plan view of a pixel cell 305-1 with a shared low conversion gain capacitor 141, in accordance with an embodiment of the disclosure. Pixel cell 305-1 is one possible way to implement pixel cell 105-1 illustrated in FIGS. 1A-1D and includes many like-labeled elements. In some embodiments, pixel cell 305-1 is representative of individual pixel cells included in pixel cell array 105 illustrated in FIG. 1A. In other words, multiple instances of pixel cell 305-1 arranged in rows and columns may form pixel cell array 105. Referring back to FIG. 3A, pixel cell 305-1 includes a semiconductor material 301, first photodiode 107-1, second photodiode 107-2, third photodiode 107-3, and fourth photodiode 107-4. Pixel cell 305-1 further includes first transfer gate electrode 109-1, second transfer gate electrode 109-2, third transfer gate electrode 109-3, fourth transfer gate electrode 109-4, first floating diffusion 113, second floating diffusion 116, third floating diffusion 117, dual floating diffusion gate electrode 121, lateral overflow gate electrode 123, first reset gate electrode 125, second reset gate electrode 127, a first source-follower gate electrode 332-1, a second source-follower gate electrode 332-2, a first row select gate electrode 336-1, a second row select gate electrode 336-2, a floating diffusion interconnect 339, shared low conversion gain capacitor 141 including a metal strip 343, lateral overflow integration capacitor 161, and various source/drain electrodes (S/D) including source/drain region 322, which may be collectively or individually referred to as pixel transistor circuitry. It is appreciated the pixel transistor circuitry, including first photodiode 107-1, second photodiode 107-2, third photodiode 107-3, fourth photodiode 107-4, first transfer gate electrode 109-1, second transfer gate electrode 109-2, third transfer gate electrode 109-3, and fourth transfer gate electrode 109-4, are formed in or on semiconductor material 301. It is appreciated that contacts between certain components or elements located in different layers of pixel 305-1 are denoted by a box with an "x" formed therein.

In the illustrated embodiment of FIG. 3A, a source/drain region of a first row select transistor associated with first row select gate electrode 336-1 and a second row select transistor associated with second row select gate electrode 336-1 are both coupled together and/or to a same bitline 171-1. It is appreciated that in some embodiments, first row select gate electrode 336-1 and second row select gate electrode 336-2 may collectively be representative of row select gate electrode 136 illustrated in FIG. 1B. Similarly, in some embodiments first source-follower gate electrode 332-1 and second source-follower gate electrode 332-2 may be collectively representative of source-follower gate electrode 132 illustrated in FIG. 1B. Referring back to FIG. 3A, first source-follower gate electrode 332-1 and second source-follower gate electrode 332-2 are coupled together by floating diffusion interconnect 339, which further couples first source-follower gate electrode 332-1 and second source-follower gate electrode 332-2 each to first floating diffusion 113 and source/drain region 322.

A source/drain region disposed between first source-follower gate electrode 332-1 and second source-follower gate electrode 332-2 is coupled to voltage source 155. In some embodiments, first source-follower gate electrode 332-1 and second source-follower gate electrode 332-2 are disposed between first reset gate electrode 336-1 and second reset gate electrode 336-2. In the same or other embodiments, first source-follower gate electrode 332-1, second source-follower gate electrode 332-2, first reset gate electrode 336-1, and/or second reset gate electrode 336-1 have a same shape, a same size, and/or are aligned with one another. In the same or other embodiments, a separation distance between first source-follower gate electrode 332-1 and first row select gate electrode 336-1 is approximately (e.g., within manufacturing variance such as 10%, 5%, or otherwise based on the manufacturing process) equal to a separation distance between second source-follower gate electrode 332-2 and second row select gate electrode 336-2. In some embodiments, a midpoint between first source-follower gate electrode 332-1 and second source-follower gate electrode 332-2 is aligned with a midpoint between first transfer gate electrode 109-1 and second transfer gate electrode 109-2 and/or between third transfer gate electrode 109-3 and fourth transfer gate electrode 109-4.

Source/drain region 322 is coupled to first floating diffusion 113 by floating diffusion interconnect 339. Source/drain region 322 is further coupled between dual floating diffusion gate electrode 121 and lateral overflow gate electrode 123. Dual floating diffusion gate electrode 121 and lateral overflow gate electrode 123 are coupled between second floating diffusion 116 and third floating diffusion 117. Lateral overflow gate electrode 123 is disposed between dual floating diffusion gate electrode 121 and first reset gate electrode 125. First reset gate electrode 125 is disposed between lateral overflow gate electrode 123 and second reset gate electrode 127. Second floating diffusion 117 is coupled to a terminal (e.g., a first terminal) of lateral overflow integration capacitor 161 while an opposite terminal (e.g., a second terminal) of lateral overflow integration capacitor 161 is coupled to receive a voltage capacitance control signal $VCAP_{SIG}$ through a source/drain terminal of the second reset transistor associated with second reset gate electrode 127. A source/drain region coupled between first reset gate electrode 125 and second reset gate electrode is coupled to voltage source 153.

In some embodiments, lateral overflow gate electrode 123 is disposed between first reset gate electrode 125 and dual floating diffusion gate electrode 121. In the same or other embodiments, first reset gate electrode 125 is disposed between lateral overflow gate electrode 123 and second reset gate electrode 127. In the same or other embodiments, dual floating diffusion gate electrode 121, lateral overflow gate electrode 123, first reset gate electrode 125, and/or second reset gate electrode 127 have a same shape, a same size, and/or are aligned with one another. In the same or other embodiments, a separation distance between dual floating diffusion gate electrode 121 and lateral overflow gate electrode 123 is approximately (e.g., within manufacturing variance such as 10%, 5%, or otherwise based on the manufacturing process) equal to a separation distance between first reset gate electrode 125 and second reset gate electrode 127. In some embodiments, a midpoint between lateral overflow gate electrode 123 and first reset gate electrode 125 is aligned with a midpoint between first transfer gate electrode 109-1 and third transfer gate electrode 109-3 and/or between second transfer gate electrode 109-2 and fourth transfer gate electrode 109-4.

FIG. 3A further shows pixel transistor circuitry 390-X and 390-Y associated with adjacent pixel cells. In one embodiment, pixel transistor circuitry 390-X is associated with a row-adjacent pixel cell (e.g., if pixel cell 305-1 corresponds to a pixel cell located in column C2 and row R2 of pixel cell array 105 illustrated in FIG. 1A, then pixel transistor circuitry 390-X is associated with an adjacent pixel cell of pixel cell array 105 located in column C2 and row R1). In the same or another embodiment, pixel transistor circuitry 390-Y is associated with a column-adjacent pixel cell (e.g., if pixel cell 305-1 corresponds to a pixel cell located in column C2 and row R2 of pixel cell array 105 illustrated in FIG. 1A, then pixel transistor circuitry 390-Y is associated with an adjacent pixel cell of pixel cell array 105 located in column C1 and row R2). Therefore, in some embodiments, pixel transistor circuitry 390-X may have the same components and connections as pixel cell 305-1 (e.g., corresponding first source-follower gate electrode, second source-follower gate electrode, first row select gate electrode, second row select gate electrode, and associated source/drain regions formed in or on semiconductor material 301). Similarly, pixel transistor circuitry 390-Y may have the same components and/or connections as pixel cell 305-1 (e.g., corresponding to a dual floating diffusion gate electrode, lateral overflow gate electrode, first reset gate electrode, second reset gate electrode, second floating diffusion, third floating diffusion, and associated source/drain regions).

It is appreciated that in some embodiments the specific arrangement of gate electrodes around (e.g., when pixel cell 305-1 is viewed from a plan view as illustrated in FIG. 3A) first floating diffusion 113, first photodiode 107-1, second photodiode 107-2, third photodiode 107-3, and/or fourth photodiode 107-4 provides reduced pixel response non-uniformity. In one embodiment, gate electrodes associated with pixel transistor circuitry included in a plurality of pixel cells (e.g., pixel cell 305-1 and adjacent pixel cells associated with pixel transistor circuitry 390-Y and 390-X) are arranged symmetrically to have at least two axes of symmetry extending over first floating diffusion 113. In some embodiments, the at least two lines of symmetry include a first axis of symmetry (e.g., corresponding to line X-X') and a second axis of symmetry (e.g., corresponding to line Y-Y') perpendicular to the first line of symmetry. In some embodiments, there is perfect symmetry about a center of first floating diffusion 113 with respect to the gate electrodes associated with the pixel transistor circuitry (e.g., the gate electrodes are mirror symmetric about any line extending through a center of first floating diffusion 113). In the illustrated embodiment, the gate electrodes included in the pixel transistor circuitry for individual pixel cells each includes a plurality of transfer gate electrodes, a plurality of source-follower gate electrodes, a plurality of row select gate electrodes, a plurality of reset gate electrodes, a dual floating diffusion gate electrode, and a lateral overflow gate electrode.

In one embodiment, the gate electrodes included in pixel transistor circuitry laterally surrounding first floating diffusion 113 with a symmetric arrangement when viewed from a plan view includes four source-follower gate electrodes (e.g., first source-follower gate electrode 332-1, second source-follower gate electrode 332-2 and two corresponding source-follower gate electrodes included in pixel transistor circuitry 390-X), four row select gate electrodes (e.g., first row select gate electrode 336-1, second row select gate electrode 336-2, and two corresponding row select gate electrodes included in pixel transistor circuitry 390-X), two dual floating diffusion gate electrodes (e.g., dual floating diffusion gate electrode 121 and a corresponding dual floating diffusion gate electrode included in pixel transistor circuitry 390-Y), two lateral overflow gate electrodes (e.g., lateral overflow gate electrode 123 and a corresponding lateral overflow gate electrode included in pixel transistor circuitry 390-Y), and four reset gate electrodes (e.g., first reset gate electrode 125, second reset gate electrode 127, and two corresponding reset gate electrodes included in pixel transistor circuitry 390-Y). In some embodiments, the gate electrodes are aligned to form a grid pattern having an aperture formed by the grid pattern that laterally surrounds the one or more photodiodes (e.g., first photodiode 107-1, second photodiode 107-2, third photodiode 107-3, and/or fourth photodiode 107-4) of a respective pixel cell included in the plurality of pixel cells (e.g., pixel cell 305-1) when the image sensor is viewed from a plan view.

In the illustrated embodiment, shared low conversion gain capacitor 141 included in each of a plurality of pixel cells (e.g., pixel cell 305-1 and/or other pixel cells included in embodiments of the disclosure) corresponds to a metal-oxide-metal capacitor. As illustrated, shared low conversion gain capacitor 141 includes a metal strip 343 (e.g., corresponding to a "metal" included in the metal-oxide-metal capacitor) formed in a metallization region on a semiconductor substrate having pixel cell array formed thereon (see, e.g., FIG. 3D) of the associated image sensor. Metal strip 343 is coupled to second floating diffusion 116 via low conversion interconnect 345 (e.g., since second floating diffusion 116 is formed within semiconductor material 301 while metal strip 343 is formed in a metal layer, such as M3, included in the metallization region as illustrated in FIG. 3D).

Figure 3B:
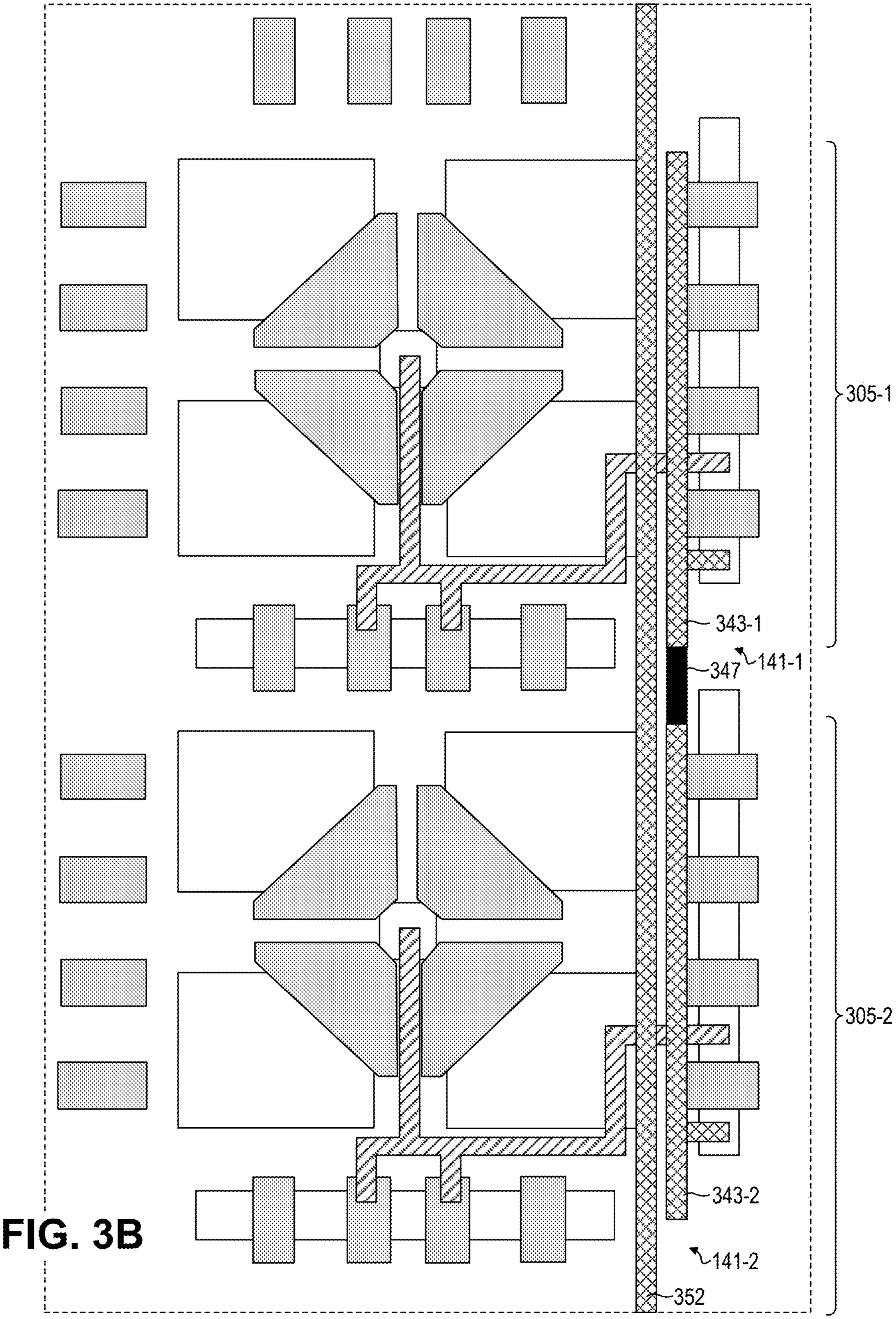
FIG. 3B illustrates a plan view of two row-adjacent pixel cells with shared low conversion gain capacitors, in accordance with an embodiment of the disclosure.

FIG. 3B illustrates a plan view of two row-adjacent pixel cells 305-1 and 305-2, with shared low conversion gain capacitors 141-1 and 141-2, in accordance with an embodiment of the disclosure. Pixel cells 305-1 and 305-2 are one possible way to implement pixel cells 105-1 and 105-2 illustrated in FIG. 1C and include the same or similar elements (e.g., labeled or otherwise), in accordance with an embodiment of the disclosure. In other words, pixel cell 305-1 corresponds to a first pixel cell and pixel cell 305-2 corresponds to a second pixel cell with pixel cell 305-1 and pixel cell 305-2 positioned adjacent to one another along a same column (e.g., pixel cell 305-1 and 305-2 may each be positioned respectively within row R1 or R2 and further positioned within column C1 of pixel cell array 105 of FIG. 1A). It is appreciated that individual components included in pixel cell 305-1 and 305-2 of FIG. 3B are not individually labeled but for shared low conversion gain capacitors 141-1 and 141-2, metal strip 343-1, metal strip 343-2, metal interconnect 347, and metal strip 352 for the sake of brevity. Pixel cell 305-2 includes the same components as pixel cell 305-1 and thus reference may be made to FIG. 3A with regards to specifics of unlabeled components included in FIG. 3B.

In the illustrated embodiment of FIG. 3B, shared low conversion gain capacitor 341-1 of pixel cell 305-1 is coupled to shared low conversion gain capacitor 341-2 of pixel cell 305-2. More specifically, metal strip 343-1 (e.g., a metal wire formed in a metallization region of the associated image sensor) of shared low conversion gain capacitor 141-1 is coupled to metal strip 343-2 (e.g., a metal wire formed in a metallization region of the associated image sensor) of shared low conversion gain capacitor 141-2 via metal interconnect 347 (e.g., a metal wire, via, or combination thereof formed in the metallization region of the associated image sensor). In some embodiments, metal strip 343-1, metal strip 343-2, and metal interconnect 347 form a continuous metal strip (e.g., a single metal wire or strip formed within an individual layer of the metallization region). However, in other embodiments, metal strip 343-1 and metal strip 343-2 may be selectively coupled together (e.g., via a binning transistor such as binning transistor 161-1 or 161-2 illustrated in FIG. 1D). In the illustrated embodiment, metal strip 343-1 and metal strip 343-2 are aligned with one another along a common direction.

In some embodiments, the shared low conversion gain capacitors 141-1 and 141-2 further each include second metal strip 352 (e.g., a metal wire, via, or combination thereof formed in the metallization region of the associated image sensor) extending parallel to both metal strip 343-1 and metal strip 343-2. It is appreciated that metal strip 343-1 and second metal strip 352 may respectively form first and second electrodes or plates of shared low conversion gain capacitor 141-1. Similarly, metal strip 343-2 and second metal strip 352 may respectively form first and second electrodes or plates of shared low conversion gain capacitor 141-2. An insulating material (e.g., an oxide material such as silicon dioxide or other intermetal dielectric) may be disposed between the first and second metal electrodes. As illustrated, second metal strip 352 is parallel to both metal strip 343-1 of shared low conversion gain capacitor 141-1 and metal strip 343-2 of shared low conversion gain capacitor 141-2. In some embodiments, second metal strip 352 corresponds to a ground line (e.g., parallel to a bitline as illustrated in FIG. 3C) such that one terminal or electrode of shared low conversion gain capacitors 341-1 and 342-2 is coupled to a ground or reference voltage while a different terminal or electrode of shared low conversion gain capacitors 341-1 and 342-2 is coupled to respective second floating diffusions (e.g., second floating diffusion 116 as illustrated in FIG. 3A).

In some embodiments, shared low conversion gain capacitors 141-1 and 141-2 are planar capacitors (e.g., metal strip 343-1, metal strip 343-2, and second metal strip 352 are each formed in the same individual layer within the metallization region of the associated image sensor). In other embodiments, metal strip 343-1, metal strip 343-2, and/or second metal strip 352 may be formed in different layers within the metallization region of the associated image sensor. In the illustrated embodiment, metal strip 343-1, metal strip 343-2, and second metal strip 352 form straight or rectangular wires or strips. However, in other embodiments, metal strip 343-1, metal strip 343-2, and/or second metal strip 352 may be configured to have a different structure to increase capacitance (e.g., an interdigitated structure).

Figure 3C:
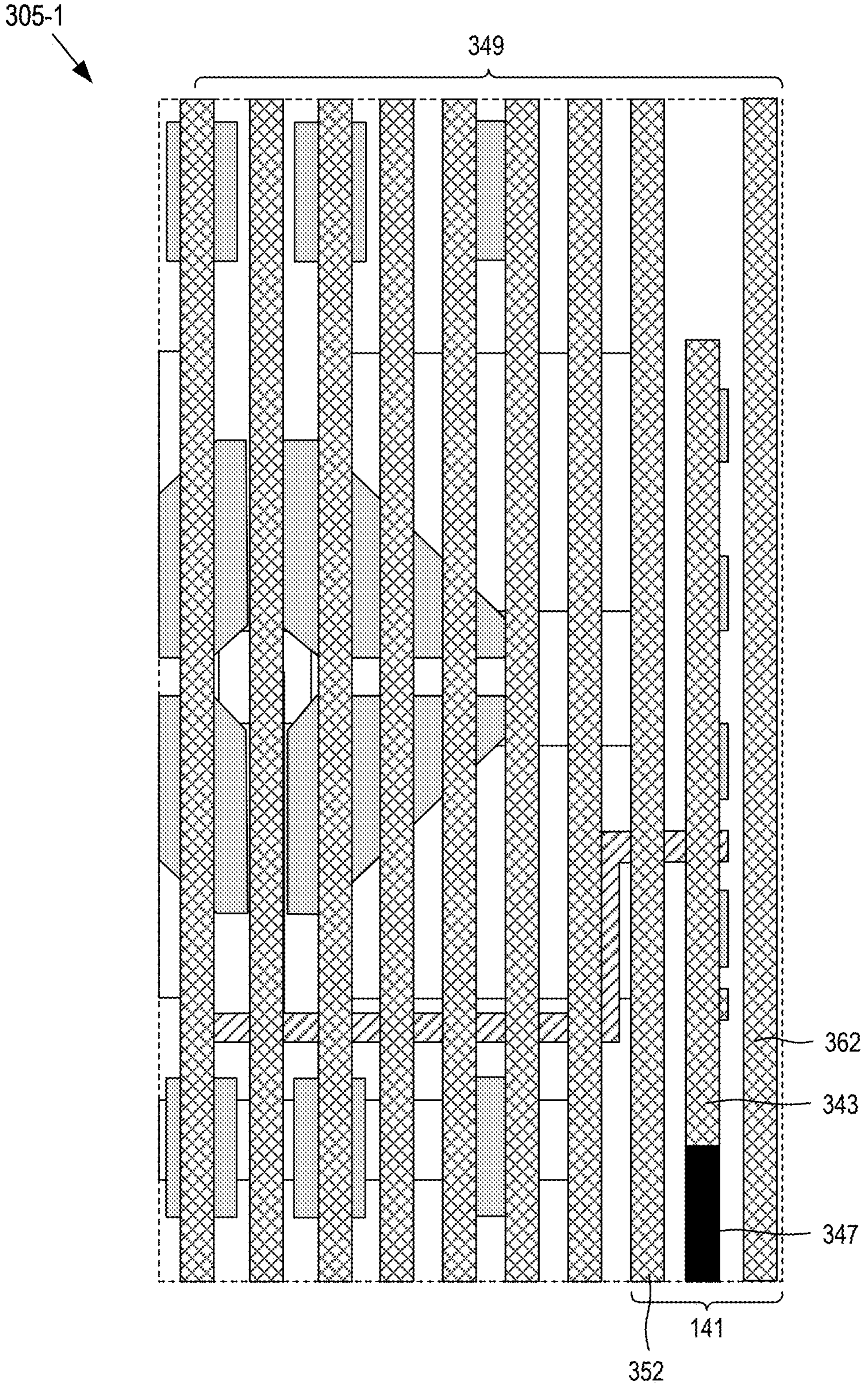
FIG. 3C illustrates an alternative view of the pixel cell illustrated in FIG. 3A-3B showing a plurality of metal wires formed in a metallization region, in accordance with an embodiment of the disclosure.
Figure 3D:
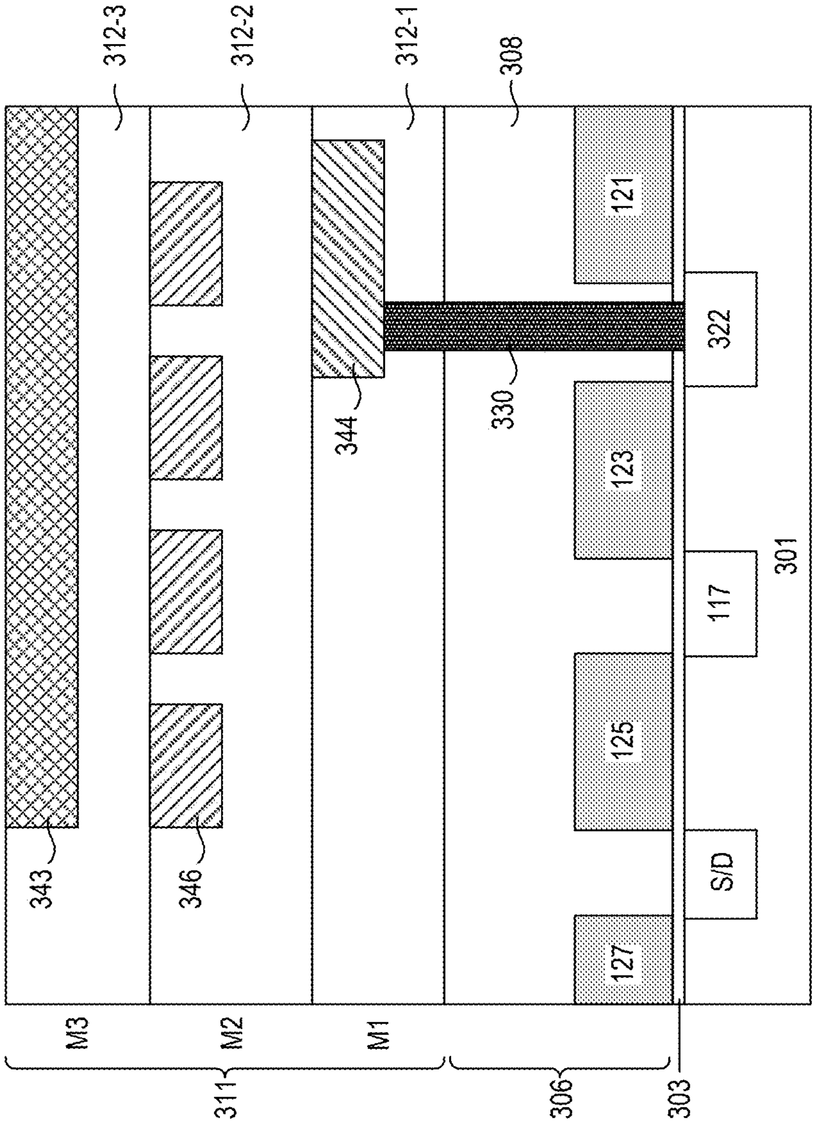
FIG. 3D illustrates an example cross-sectional view of the pixel cell illustrated in FIG. 3A, in accordance with an embodiment of the disclosure.

FIG. 3C illustrates an alternative view of pixel cell 305-1 illustrated in FIG. 3A-3B showing a plurality of metal wires 349 formed in a metallization region, in accordance with an embodiment of the disclosure. Plurality of metal wires 349 include metal strip 343, second metal strip 352, metal interconnect 347, a third metal strip 362, and a plurality of unlabeled metal wires. In some embodiments, second metal strip 352 and third metal strip 362 are each coupled to a ground or reference voltage and aligned parallel to metal strip 343 to form electrodes of shared low conversion gain capacitor 141 that metal strip 343 is disposed therebetween. The unlabeled metal wires included in plurality of metal wires 349 may include additional ground lines, bitlines (e.g., one or more of plurality of bitlines 171 illustrated in FIG. 1B), or other metal wires coupled to a voltage source (e.g., voltage source 153 and/or voltage source 155 illustrated in FIG. 1B), which in some embodiments may be parallel to metal strip 343, second metal strip 352, and/or third metal strip 362.

FIG. 3D illustrates an example cross-sectional view of pixel cell 305-1 illustrated in FIG. 3A, in accordance with an embodiment of the disclosure. The example view illustrated by FIG. 3D extends through or along metal strip 343 illustrated in FIG. 3A (e.g., parallel to line Y-Y'). It is appreciated that for illustrative purposes certain elements have been included for the sake of discussion and may not necessarily lie directly below metal strip 343. Pixel cell 305-1 forms a stack of layers including semiconductor material 301, gate dielectric 303, interlayer dielectric region 306, and metallization region 311. Metallization region includes at least three individual layers, including a first metal layer M1, a second metal layer M2, and a third metal layer M3. Gate dielectric 303 is disposed between interlayer dielectric region 306 and semiconductor material 301. Interlayer dielectric region 306 is disposed between gate dielectric 303 and metallization region 311.

Floating diffusions, source/drain regions, and photodiodes of pixel cell 305-1 correspond to doped regions disposed or formed within semiconductor material 301 (e.g., third floating diffusion 117, source/drain region 322, and source/drain region S/D as illustrated). In some embodiments, semiconductor material 301 includes or is otherwise formed of silicon, a silicon germanium alloy, germanium, a silicon carbide alloy, an indium gallium arsenide alloy, any other alloys formed of III-V group compounds, combinations thereof, one or more epitaxial layers of the aforementioned materials, or a bulk substrate thereof. More specifically, semiconductor material 301 may correspond to any semiconductor material or combination of materials that may be doped or otherwise configured to facilitate the formation of an integrated circuit (e.g., individual circuitry components such as source/drain regions of transistors, memory elements, photodiodes, or the like). In one embodiment, semiconductor material 301 corresponds to an epitaxial layer (e.g., P-type silicon layer or N-type silicon layer). In such an embodiment, photodiodes (e.g., first photodiode 107-1, second photodiode 107-2, third photodiode 107-3, and fourth photodiode 107-4 illustrated in FIG. 1B or other photodiodes included in pixel cell array 105 illustrated in FIG. 1A) may be formed in the epitaxial layer corresponding to semiconductor material 301.

It is appreciated that the term "photodiode" (e.g., first photodiode 107-1, second photodiode 107-2, and/or other photodiodes included in pixel cell 105-1 illustrated in FIG. 1B or the associated image sensor) correspond to a doped region (e.g., formed via implantation) disposed within or otherwise surrounded by an oppositely doped region to form a photosensitive area capable of photogenerating image charge in response to incident light. For example, first photodiode 107-1 and/or second photodiode 107-2 may correspond to an N-type semiconductor region (e.g., N-doped silicon region) disposed within a P-type semiconductor material (e.g., P-type doped silicon corresponding to semiconductor material 301). Accordingly, in some embodiments first photodiode 107-1, second photodiode 107-2, and other photodiodes included in pixel cell 305-1 or other pixel cells included in embodiments of the disclosure each includes a doped region that is oppositely doped (e.g., opposite conductivity type) relative to a doping type of semiconductor material 301. Other components formed within semiconductor material 301 such as third floating diffusion 117, other floating diffusions (e.g., first floating diffusion 113, second floating diffusion 115), source/drain regions, and the like corresponds to doped regions (e.g., via implantation) disposed within semiconductor material 301.

In some embodiments, gate dielectric 303 includes one or more insulating materials (e.g., silicon dioxide, silicon oxynitride, hafnium dioxide, alumina oxide, zirconium oxide, or other gate dielectric materials known by one of ordinary skill in the art). Gate electrodes included in pixel cell 305-1 are disposed within interlayer dielectric region 306 (e.g., dual floating diffusion gate electrode 121, lateral overflow gate electrode 123, first reset gate electrode 125, and second reset gate electrode 127 as illustrated) proximate to gate dielectric 303. In some embodiments, gate electrodes included in pixel cell 305-1 and formed within interlayer dielectric region 306 may include or otherwise correspond to a metal material (e.g., Au, Ag, Al, Cu, Ta, Ti, Nb, W, Mo), polycrystalline silicon (extrinsic or intrinsic), a silicide material, metal composites (e.g., WN, TiN, TaN, TiAl, TiAIC, other metal nitrides, $RuO_x$, or other metal oxide electrode materials), other conductive materials with the appropriate conductivity and work function, or combinations thereof to facilitate image charge transfer. In some embodiments, gate electrodes formed within interlayer dielectric region 306 may be encapsulated by interlayer dielectric material 308, which may include one or more insulating materials (e.g., silicon dioxide, a tetraethylorthosilicate, a high density plasma oxide material, other insulating materials, or combinations thereof).

First metal layer M1 of metallization region 311 includes a plurality of metal wires 344 encapsulated, isolated by, or otherwise disposed within one or more insulating materials 312-1. Second metal layer M2 of metallization region 311 includes a plurality of metal wires 346 encapsulated, isolated by, or otherwise disposed within one or more insulating materials 312-2. Third metal layer M3 of metallization region 311 includes a plurality of metal wires (e.g., metal strip 343, bitlines, ground lines, or the like) encapsulated, isolated by, or otherwise disposed within one or more insulating materials 312-3. It is appreciated that one or more vias (e.g., via 330) may couple plurality of metal wires included in metallization region 311 to various components of pixel cell 305-1 formed within interlayer dielectric region 306 and semiconductor material 301.

Figure 4:
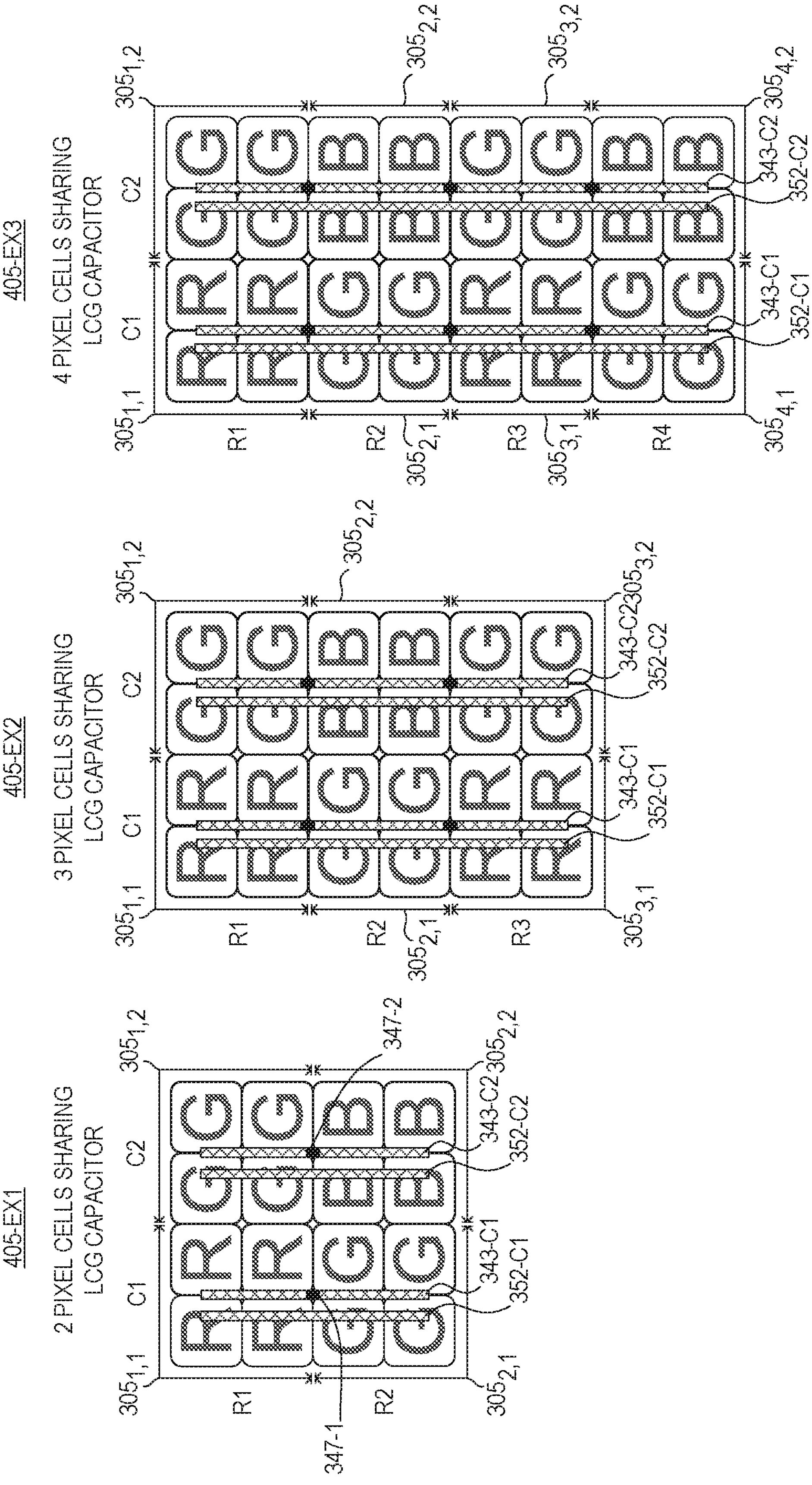
FIG. 4 illustrates example schemes for sharing low conversion gain capacitors between row-adjacent pixel cells, in accordance with embodiments of the disclosure.

FIG. 4 illustrates example schemes for sharing low conversion gain capacitors between row-adjacent pixel cells, in accordance with embodiments of the disclosure. Example schemes include two pixel cells sharing low conversion gain capacitors (e.g., scheme 405-EX1), three pixel cells sharing low conversion gain capacitors (e.g., scheme 405-EX2), and four pixel cells sharing low conversion gain capacitors (e.g., scheme 405-EX3). Each pixel cell is labeled by location based on row and column position and includes pixel cells $\mathbf{305}_{1,1}$, $\mathbf{305}_{1,2}$, $\mathbf{305}_{2,1}$, $\mathbf{305}_{2,2}$, $\mathbf{305}_{3,1}$, $\mathbf{305}_{3,2}$, $\mathbf{305}_{4,1}$, and $\mathbf{305}_{4,2}$, where the first subscript is indicative of row (e.g., row R1 or row R2) and the second subscript is indicative of column (e.g., column C1 or column C2). The pixel cells illustrated in FIG. 4 form pixel cell arrays (e.g., one possible implementation of pixel cell array 105 illustrated in FIGS. 1A-1D) and further may correspond to pixel cells illustrated in FIG. 1A-3D or otherwise discussed in embodiments of the disclosure. Each of the example schemes illustrated in FIG. 4 also include shared low conversion gain capacitors (e.g., a first shared low conversion gain capacitor extending across multiple rows along column C1 that includes metal strips 343-C1 and 352-C1 and a second shared low conversion gain capacitor extending across multiple rows along column C2 that includes metal strips 343-C2 and 352-C2). Metal strips 343-C1 and 343-C2 correspond to a collective representation of metal strips shared between row-adjacent pixel cells coupled by a metal interconnect 347-1 or 347-2 (e.g., metal interconnect 347 coupling metal strip 343-1 and 343-2 of FIG. 3B). For the sake of brevity, metal strips 343-C1 and 343-C2 are not individually labeled to show a shared low conversion gain capacitor for each pixel cell.

Scheme 405-EX1 shows two row-adjacent pixel cells with shared low conversion gain capacitors coupled together. Shared low conversion gain capacitors of red pixel cell $\mathbf{305}_{1,1}$ and green pixel cell $\mathbf{305}_{2,1}$ are coupled together as shown by metal strips 343-C1 and 352-C1. In the same embodiment, shared low conversion gain capacitors of green pixel cell $\mathbf{305}_{1,2}$ and blue pixel cell $\mathbf{305}_{2,2}$ are coupled together as shown by metal strips 343-C2 and 352-C2 of scheme 405-EX1.

Scheme 405-EX2 shows three row-adjacent pixel cells with shared low conversion gain capacitors coupled together. Shared low conversion gain capacitors of red pixel cell $\mathbf{305}_{1,1}$, green pixel cell $\mathbf{305}_{2,1}$, and red pixel cell $\mathbf{305}_{3,1}$ are coupled together as shown by metal strips 343-C1 and 352-C1. In the same embodiment, shared low conversion gain capacitors of green pixel cell $\mathbf{305}_{1,2}$ blue pixel cell $\mathbf{305}_{2,2}$, and green pixel cell $\mathbf{305}_{3,2}$ are coupled together as shown by metal strips 343-C2 and 352-C2 of scheme 405-EX2. For example, if pixel cell $\mathbf{305}_{1,1}$ is referred to as a first pixel cell, pixel cell $\mathbf{305}_{2,1}$ is referred to as a second pixel cell, and pixel cell $\mathbf{305}_{3,1}$ is referred to a third pixel cell with the second pixel cell disposed between the first pixel cell and the third pixel cell and each of the first, second, and third pixel cells positioned in a same column (e.g., column C1). In such an embodiment, the shared low conversion gain capacitor of the second pixel cell is coupled to the shared low conversion gain capacitor of the first pixel cell and the third pixel cell.

Scheme 405-EX3 shows four row-adjacent pixel cells with shared low conversion gain capacitors coupled together. Shared low conversion gain capacitors of red pixel cell $\mathbf{305}_{1,1}$, green pixel cell $\mathbf{305}_{2,1}$, red pixel cell $\mathbf{305}_{3,1}$, and green pixel cell $\mathbf{305}_{4,1}$ are coupled together as shown by metal strips 343-C1 and 352-C1. In the same embodiment, shared low conversion gain capacitors of green pixel cell $\mathbf{305}_{1,2}$ blue pixel cell $\mathbf{305}_{2,2}$, green pixel cell $\mathbf{305}_{3,2}$, and blue pixel cell $\mathbf{305}_{4,2}$ are coupled together as shown by metal strips 343-C2 and 352-C2 of scheme 405-EX3. For example, if pixel cell $\mathbf{305}_{1,1}$ is referred to as a first pixel cell, pixel cell $\mathbf{305}_{2,1}$ is referred to as a second pixel cell, pixel cell $\mathbf{305}_{3,1}$ is referred to a third pixel cell, and pixel cell $\mathbf{305}_{4,1}$ is referred to as a fourth pixel cell with the second pixel cell disposed between the first pixel cell and the third pixel cell, the third pixel cell disposed between the second pixel cell and the fourth pixel cell, and each of the first, second, third, and fourth pixel cells positioned in a same column (e.g., column C1). In such an embodiment, the shared low conversion gain capacitor of the second pixel cell is coupled to the shared low conversion gain capacitor of the first pixel cell and the third pixel cell and the shared low conversion gain capacitor of the third pixel cell is further coupled to the shard low conversion gain capacitor of the fourth pixel cell.

It is appreciated that in some embodiments of the disclosure, the metal strip of shared low conversion gain capacitors in different columns may be parallel to one another. For example, metal strip 343-C1 is aligned and parallel to metal strip 343-C2, which is located in a column-adjacent pixel cell (e.g., metal strip 343-C1 is located in column C1 while metal strip 343-C2 is located in column C2).

In some embodiments, the sharing schemes 405-EX1, 405-EX2, and/or 405-EX3 may be repeated to collectively form a pixel cell array (e.g., pixel cell array 105 illustrated in FIG. 1A-1D). For example, if scheme 405-EX1 illustrated pixel cell $\mathbf{305}_{3,1}$, then the shared low conversion gain capacitor of pixel cell $\mathbf{305}_{3,1}$ would not be coupled to the shared low conversion gain capacitor of the row-adjacent pixel cell $\mathbf{305}_{2,1}$. Similarly, if scheme 405-EX2 illustrated pixel cell $\mathbf{305}_{4,1}$, then the shared low conversion gain capacitor of pixel cell $\mathbf{305}_{4,1}$ would not be coupled to the shared low conversion gain capacitor of the row-adjacent pixel cell $\mathbf{305}_{3,1}$.

It is appreciated that the operation of individual pixel cells in schemes 405-EX1, 405-EX2, 405-EX3, and other embodiments of the disclosure enables full pixel cell (e.g., the increased capacitance from the coupled shared low conversion gain capacitors increases full well capacity sufficiently to enable low conversion gain readout of pixel cells having four or more photodiodes) without loss of resolution. However, as previously discussed, in order to prevent color mixing the dual floating diffusion transistor associated with coupled shared low conversion gain capacitors should be configured to an off state meaning certain pixel cells are not simultaneously active. For example, when pixel cell $\mathbf{305}_{1,1}$ is active in schemes 405-EX1, 405-EX2, or 405-EX3 then pixel cell $\mathbf{305}_{2,1}$ is inactive. Depending on the number of shared low conversion gain capacitors that are coupled together, the number of inactive pixels may increase. For example, in scheme 405-EX2, pixel cells $\mathbf{305}_{2,1}$ and $\mathbf{305}_{3,1}$ are inactive when pixel cell $\mathbf{305}_{1,1}$ is active. After operation of pixel cell $\mathbf{305}_{1,1}$ then pixel cell $\mathbf{305}_{1,1}$, may be made inactive and pixel cell $\mathbf{305}_{2,1}$ made active, and so on such that each pixel may be readout regardless of the number of shared low conversion gain capacitors that are coupled together.

It is appreciated that embodiments of the disclosure illustrated in FIG. 1A-4 may be fabricated using conventional semiconductor device processing and microfabrication techniques known by one of ordinary skill in the art, which may include, but is not limited to, photolithography, ion implantation, chemical vapor deposition, physical vapor deposition, thermal evaporation, sputter deposition, reactive-ion etching, plasma etching, wafer bonding, chemical mechanical planarization, and the like. It is appreciated that the described techniques are merely demonstrative and not exhaustive and that other techniques may be utilized to fabricate one or more components of various embodiments of the disclosure.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising:

a pixel cell array including a plurality of pixel cells arranged in rows and columns, wherein individual pixel cells included in the plurality of pixel cells each includes:

one or more photodiodes configured to photogenerate image charge in response to incident light;

a first floating diffusion, a second floating diffusion, and a third floating diffusion, wherein the first floating diffusion is coupled to receive the image charge from the one or more photodiodes;

a dual floating diffusion transistor coupled between the first floating diffusion and the second floating diffusion;

a lateral overflow transistor coupled between the first floating diffusion and the third floating diffusion, wherein the dual floating diffusion transistor and the lateral overflow transistor are coupled in parallel to the first floating diffusion; and a shared low conversion gain capacitor coupled to the dual floating diffusion transistor, wherein the second floating diffusion is coupled between the shared low conversion gain capacitor and the first floating diffusion.

2. The image sensor of claim 1, wherein the plurality of pixel cells includes a first pixel cell and a second pixel cell adjacent to the first pixel cell, and wherein the shared low conversion gain capacitor of the first pixel cell is coupled to the shared low conversion gain capacitor of the second pixel cell.

3. The image sensor of claim 2, wherein the shared low conversion gain capacitor included in each of the plurality of pixel cells corresponds to a metal-oxide-metal capacitor, wherein the plurality of pixel cells each further include a lateral overflow integration capacitor, and wherein the third floating diffusion is coupled between the lateral overflow integration capacitor and the first floating diffusion for each of the plurality of pixel cells to receive overflow image charges from the one or more photodiodes, wherein a capacitance of the lateral overflow integration capacitor is greater than the shared low conversion gain capacitor.

4. The image sensor of claim 2, wherein the shared low conversion gain capacitor includes a metal strip formed in a metallization region of the image sensor for each of the plurality of pixel cells, and wherein the metal strip of the shared low conversion gain capacitor included in the first pixel cell is coupled to the metal strip of the shared low conversion gain capacitor included in the second pixel cell.

5. The image sensor of claim 4, further comprising a ground line formed in the metallization region and arranged parallel to both the metal strip of the shared low conversion gain capacitor included in the first pixel cell and the metal strip of the shared low conversion gain capacitor included in the second pixel cell, wherein the image sensor further includes a plurality of bitlines coupled to the pixel cell array, and wherein the ground line, the metal strip included in the first pixel cell, and the metal strip included in the second pixel cell are parallel to a bitline included in the plurality of bitlines.

6. The image sensor of claim 2, wherein the plurality of pixel cells further include a third pixel cell and a fourth pixel cell, wherein the first, second, third, and fourth pixel cells are positioned in a same column included in the columns of the pixel cell array, wherein the second pixel cell is row-adjacent to the first pixel cell and the third pixel cell, wherein the fourth pixel cell is row-adjacent to the third pixel cell, and wherein the shared low conversion gain capacitor of the first pixel cell and the shared low conversion gain capacitor the second pixel cell are further coupled to:

(i) the shared low conversion gain capacitor of the third pixel cell but not the shared low conversion gain capacitor of the fourth pixel cell; or (ii) the shared low conversion gain capacitor of the third pixel cell and the shared low conversion gain capacitor of the fourth pixel cell.

7. The image sensor of claim 2, further comprising a binning transistor coupled between the shared low conversion gain capacitor of the first pixel cell and the shared low conversion gain capacitor of the second pixel cell such that the shared low conversion gain capacitor of the first pixel cell is selectively coupled to the shared low conversion gain capacitor of the second pixel cell.

8. The image sensor of claim 2, wherein the first pixel cell and the second pixel cell are positioned in a same column included in the columns of the pixel cell array, and wherein the dual floating diffusion transistor of the second pixel cell is configured to be off during a readout period for the first pixel cell, wherein the readout period for the first pixel cell includes at least a high conversion gain mode and a low conversion gain mode, wherein conversion gain associated with the low conversion gain mode is less than conversion gain associated with the high conversion gain mode.

9. The image sensor of claim 8, wherein an off voltage for the dual floating diffusion transistor of the second pixel cell is lower than an off voltage for the dual floating diffusion transistor of the first pixel cell during an integration period for the first pixel cell, and wherein the dual floating diffusion transistor of the second pixel cell is configured to be off throughout the readout period of the first pixel cell.

10. The image sensor of claim 1, further comprising control circuitry configured to apply a first voltage to a dual floating diffusion gate electrode included in the dual floating diffusion transistor of the first pixel cell and a second voltage to a lateral overflow gate electrode included in the lateral overflow transistor of the first pixel cell during a high conversion gain mode included in a readout period for the first pixel cell, wherein the first voltage is greater than the second voltage.

11. The image sensor of claim 1, wherein the individual pixel cells included in the plurality of pixel cells each further includes:

a first source-follower transistor and a second source-follower transistor, wherein a first source-follower gate electrode included in the first source-follower transistor is coupled to a second source-follower gate electrode included in second source-follower transistor; and a first row select transistor and a second row select transistor, and wherein the first source-follower gate electrode and the second source-follower gate electrode are both disposed between a first row select gate electrode included in the first row select transistor and a second row select gate electrode included in the second row select transistor.

12. The image sensor of claim 1, wherein the individual pixel cells included in the plurality of pixel cells each further includes:

a first source-follower transistor and a second source-follower transistor, wherein a first source-follower gate electrode included in the first source-follower transistor is coupled to a second source-follower gate electrode included in second source-follower transistor; and a source/drain region coupled between a dual floating diffusion gate electrode included in the dual floating diffusion transistor and a lateral overflow gate electrode included in the lateral overflow transistor, and wherein the first source-follower gate electrode and the second source-follower gate electrode are coupled to the first floating diffusion and the source/drain region.

13. The image sensor of claim 1, wherein gate electrodes associated with pixel transistor circuitry included in the plurality of pixel cells are arranged symmetrically to have at least two axes of symmetry extending over the first floating diffusion included in a first pixel cell included in the plurality of pixel cells.

14. The image sensor of claim 13, wherein the gate electrodes included in the pixel transistor circuitry for the individual pixel cells included in the plurality of pixel cells each further includes a plurality of source-follower gate electrodes, a plurality of row select gate electrodes, a plurality of reset gate electrodes, a dual floating diffusion gate electrode, and a lateral overflow gate electrode.

15. The image sensor of claim 1, further comprising control circuitry configured to apply an off voltage to a dual floating diffusion gate electrode associated with the dual floating diffusion transistor of a first pixel cell included in the plurality of pixel cells during an integration period for the first pixel cell, an intermediate voltage to the dual floating diffusion gate electrode during a high conversion gain mode of a readout period for the first pixel cell, and an on voltage to the dual floating diffusion gate electrode during a low conversion gain mode of the readout period for the first pixel cell, wherein the intermediate voltage and the on voltage are each positive voltage levels, and wherein the on voltage is greater than the intermediate voltage.

16. An imaging system, comprising:

a pixel cell array, including a plurality of pixel cells arranged in rows and columns, wherein individual pixel cells included in the plurality of pixel cells each includes:

one or more photodiodes configured to photogenerate image charge in response to incident light;

a first floating diffusion and a second floating diffusion, wherein the first floating diffusion is coupled to receive the image charge from the one or more photodiodes;

a dual floating diffusion transistor coupled between the first floating diffusion and the second floating diffusion; and a shared low conversion gain capacitor coupled to the dual floating diffusion transistor and selectively coupled to the first floating diffusion;

a plurality of bitlines coupled to the pixel cell array;

control circuitry coupled to the pixel cell array to control operation of the pixel cell array; and readout circuitry coupled to the pixel cell array through the plurality of bitlines to readout image data representative of the image charge from the pixel cell array, wherein the plurality of pixel cells includes a first pixel cell and a second pixel cell adjacent to the first pixel cell, and wherein the shared low conversion gain capacitor of the first pixel cell is coupled to the shared low conversion gain capacitor of the second pixel cell.

17. The imaging system of claim 16, wherein the first pixel cell is row-adjacent to the second pixel cell, wherein a metal electrode of the shared low conversion gain electrode included in the first pixel cell is coupled to a metal electrode of the shared low conversion gain electrode included in the second pixel cell, and wherein the first metal electrode and the second metal electrode are parallel to a bitline included in the plurality of bitlines.

18. The imaging system of claim 16, wherein the dual floating diffusion transistor of the second pixel cell is configured to be off by the control circuitry during an integration period and a readout period for the first pixel cell, wherein the readout period for the first pixel cell includes a high conversion gain mode and a low conversion gain mode.

19. The imaging system of claim 18, wherein during the integration period for the first pixel cell, the control circuitry is configured to apply a first off voltage to a dual floating diffusion gate electrode included in the dual floating diffusion transistor of the first pixel cell and a second off voltage to a dual floating diffusion gate electrode included in the dual floating diffusion transistor of the second pixel cell, and wherein the second off voltage is lower than the first off voltage.

20. The imaging system of claim 16, wherein the control circuitry is configured to apply an off voltage to a dual floating diffusion gate electrode associated with the dual floating diffusion transistor of the first pixel cell during an integration period for the first pixel cell, an intermediate voltage to the dual floating diffusion gate electrode during a high conversion gain mode of a readout period for the first pixel cell, and an on voltage to the dual floating diffusion gate electrode during a low conversion gain mode of the readout period for the first pixel cell, wherein the intermediate voltage and the on voltage are each positive voltage levels, and wherein the on voltage is greater than the intermediate voltage.

* * * * *